US012208667B2

(12) United States Patent
Vanhee et al.

(10) Patent No.: US 12,208,667 B2
(45) Date of Patent: Jan. 28, 2025

(54) VEHICLE PROPULSION UNIT WITH ELECTRIC MACHINE THAT INCLUDES A BALANCING PLATE ASSEMBLY AND METHOD FOR ASSEMBLING SAID ELECTRIC MACHINE

(71) Applicant: Dana Belgium N.V., Flanders (BE)

(72) Inventors: Steven Vanhee, Hooglede (BE); Stephan Schlimpert, Sint-Truiden (BE); Bart Peremans, Diest (BE); Bram Robberechts, Leuven (BE); Jasper Nonneman, Berchem (BE)

(73) Assignee: DANA BELGIUM N.V., Bruges (BE)

( * ) Notice: Subject to any disclaimer, the term of this patent is extended or adjusted under 35 U.S.C. 154(b) by 622 days.

(21) Appl. No.: 17/452,008

(22) Filed: Oct. 22, 2021

(65) Prior Publication Data

US 2023/0126006 A1  Apr. 27, 2023

(51) Int. Cl.
| | |
|---|---|
| *B60K 1/00* | (2006.01) |
| *F04D 19/00* | (2006.01) |
| *F04D 25/06* | (2006.01) |
| *H02K 1/22* | (2006.01) |
| *H02K 7/00* | (2006.01) |

(52) U.S. Cl.
CPC .............. *B60K 1/00* (2013.01); *F04D 19/002* (2013.01); *F04D 25/06* (2013.01); *H02K 1/22* (2013.01); *H02K 7/003* (2013.01)

(58) Field of Classification Search
CPC . H03K 1/22; H03K 7/003; B60K 1/00; F04D 19/002; F04D 25/06
USPC .......................................................... 310/54
See application file for complete search history.

(56) References Cited

U.S. PATENT DOCUMENTS

| | | | |
|---|---|---|---|
| 4,496,862 A | | 1/1985 | Weber |
| 4,517,479 A | | 5/1985 | Aleem et al. |
| 7,578,621 B2 | | 8/2009 | Nishimura et al. |
| 7,736,061 B2 | | 6/2010 | Gotoh et al. |
| 9,300,189 B2 | | 3/2016 | Hautz et al. |
| 2003/0168815 A1 | | 9/2003 | Rensch |
| 2009/0302720 A1* | | 12/2009 | Chiba ................. H02K 5/24 310/90 |
| 2019/0277307 A1* | | 9/2019 | Horng ................. F04D 25/06 |

(Continued)

FOREIGN PATENT DOCUMENTS

| | | | | |
|---|---|---|---|---|
| AU | 2010231801 A1 | | 10/2011 | |
| CN | 108365703 | * | 8/2018 | ............. H02K 9/06 |
| CN | 211018463 U | | 7/2020 | |

(Continued)

OTHER PUBLICATIONS

Machine translation of CN108365703 Li et al. (Year: 2018).*

(Continued)

*Primary Examiner* — Terrance L Kenerly
(74) *Attorney, Agent, or Firm* — McCoy Russell LLP

(57) ABSTRACT

An electromagnetic propulsion unit for a land-based wheeled or tracked vehicle is provided. The propulsion unit includes a balancing plate assembly with an outer plate designed to couple to a rotor assembly. In the balancing plate assembly, the outer plate includes a lip that, during rotor assembly rotation, pumps one or more fluids from an air gap formed between the rotor assembly and a stator and the outer plate is constructed out of a non-electrically conductive material.

20 Claims, 26 Drawing Sheets

(56) References Cited

U.S. PATENT DOCUMENTS

| | | | |
|---|---|---|---|
| 2020/0347881 | A1 | 11/2020 | Devitt et al. |
| 2021/0234423 | A1* | 7/2021 | Leonardi ............... B60K 11/02 |

FOREIGN PATENT DOCUMENTS

| | | | |
|---|---|---|---|
| DE | 102007021917 A1 | 11/2008 | |
| DE | 102016216083 A1 | 3/2018 | |
| EP | 3054565 A1 | 8/2016 | |
| EP | 3486535 A1 | 5/2019 | |
| JP | H07105203 A | 4/1995 | |
| JP | 2006005990 A | 1/2006 | |
| JP | 5128840 B2 | 1/2013 | |
| JP | 5359112 B2 | 12/2013 | |
| WO | 03098777 A1 | 11/2003 | |
| WO | 2008107402 A2 | 9/2008 | |
| WO | 2015181326 A1 | 12/2015 | |
| WO | 2017017227 A1 | 2/2017 | |

OTHER PUBLICATIONS

Day, M., "Hydrodynamic Seals in the Pulp & Paper Industry," R.F. MacDonald Co. Website, Available Online at https://www.rfmacdonald.com/pump-white-papers/process-pumps/hydrodynamic-seals-in-the-pulp-paper-industry/, Available as Early as Jan. 1995, 6 pages.

"Seals," University of Michigan Chemical Engineering Website, Available Online at https://encyclopedia.che.engin.umich.edu/Pages/TransportStorage/Seals/Seals.html, Available as Early as Apr. 6, 2014, 16 pages.

Warda, H. et al., "Integral Pumping Devices for Dual Mechanical Seals: Experiments and Numerical Simulations," Journal of Engineering for Gas Turbines and Power, vol. 137, No. 2, Feb. 2015, 10 pages.

Targaoui, M. et al., "On the Hydrodynamic Sealing in Lubricated Viscoseals," Tribology Transactions, vol. 58, No. 3, Mar. 20, 2015, 11 pages.

"Hydrodynamic AIDS for HD Assemblies," Vanseal Website, Available Online at https://vansealcorp.com/hydrodynamic-seal-design/, Available as Early as Oct. 31, 2015, 4 pages.

"The Hydrodynamic Shaft Seal," Bungartz Website, Available Online at https://bungartz.de/en/dichtungen.html, Available as Early as Aug. 5, 2016, 1 page.

"Ansi Hydrodynamic Seal Pump—Magnatex 3596 Repeller/Expeller Series," MAGNATEX Website, Available Online at https://magnatexpumps.com/hydrodynamic-seal-repeller-pump.php, Available as Early as Jan. 26, 2018, 3 pages.

"Pumping Rings—Designing and Using Pumping Rings," Wayback Machine Website, Available Online at https://web.archive.org/web/20180220230932/http://www.sealfaqs.com/?page_id=395, Available as Early as Feb. 20, 2018, 11 pages.

"Hydrodynamic Sealing," Rheinhütte Pumpen Website, Available Online at https://www.rheinhuette.de/en/products/sealings/hydrodynamic-sealing/, Available as Early as Dec. 3, 2020, 1 page.

"How a Centrifuge Works," Drucker Diagnostics Website, Available Online at https://druckerdiagnostics.com/knowledge/how-a-centrifuge-works/, Available as Early as Mar. 9, 2021, 5 pages.

"MD&A Parts Division Advanced Seal System: Consisting of the Patented Guardian & Vortex Shedder Sealing Technology," MDA Turbines Website, Available Online at https://www.mdaturbines.com/library/advanced-sealing-systems-2/, Retrieved on Oct. 21, 2021, 3 pages.

"Hydrodynamic Effect," ESP International Website, Available Online at https://www.espint.com/engineering/technical-reference-guides/radial-shaft-seal-guide/hydrodynamic-effect, Retrieved on Oct. 21, 2021, 5 pages.

\* cited by examiner

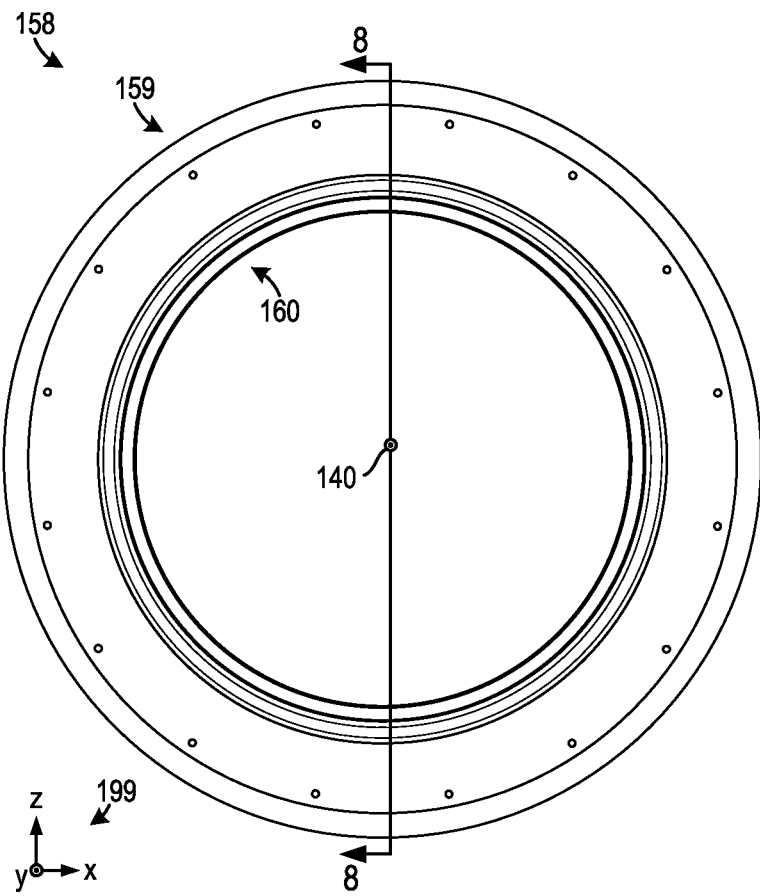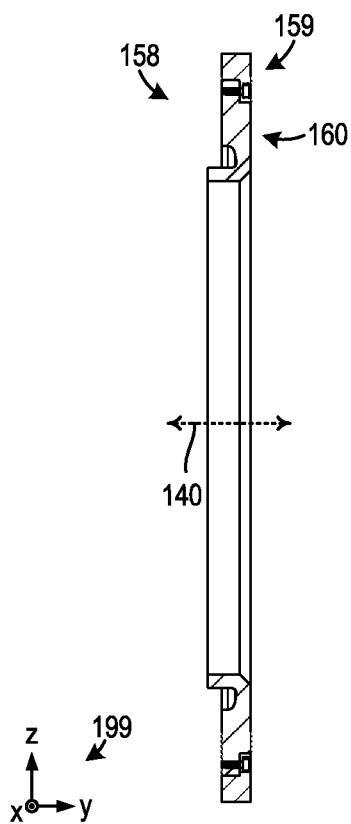
FIG. 7          FIG. 8
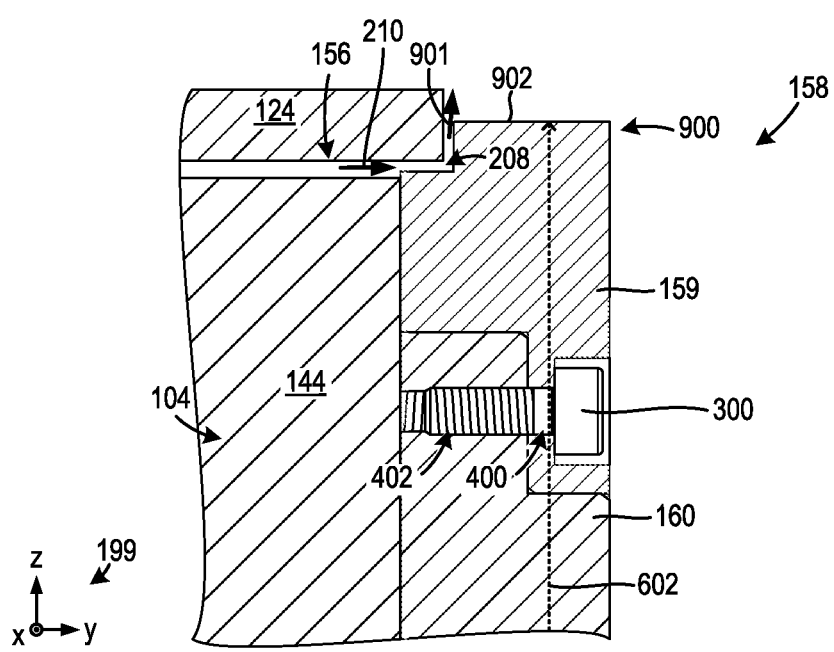
FIG. 9

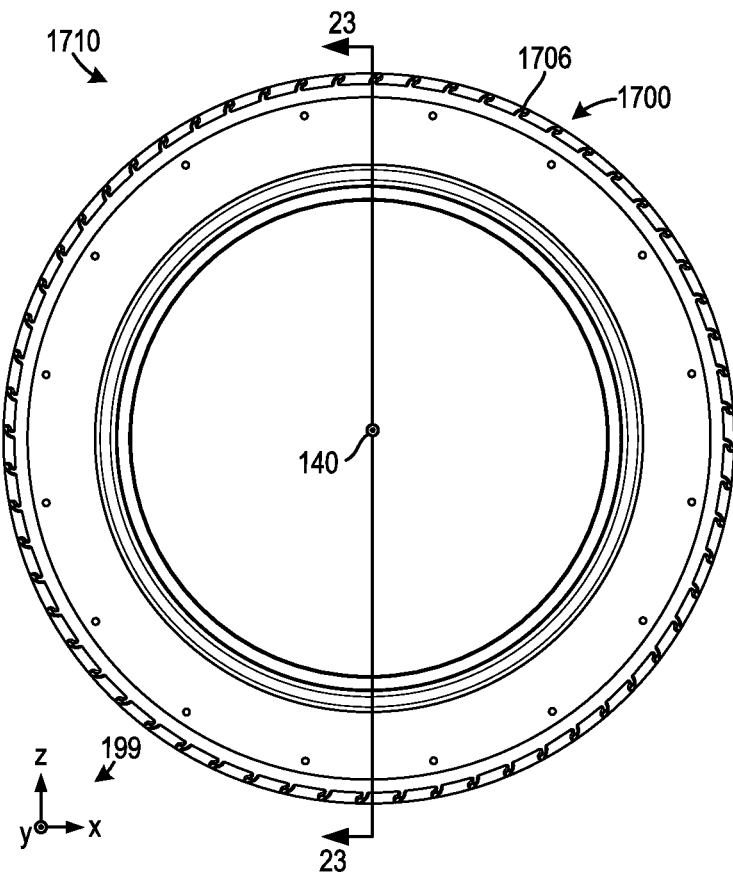
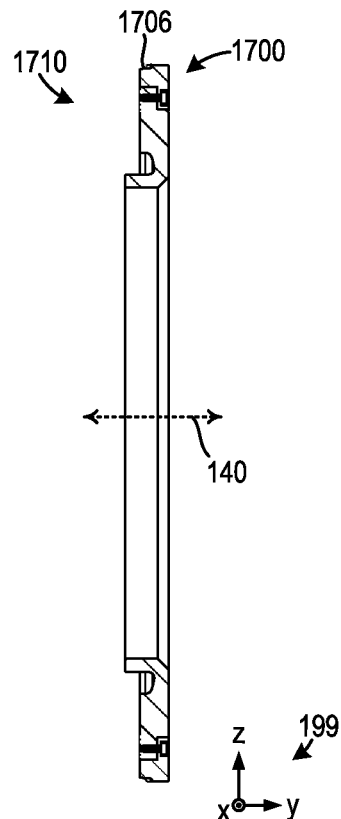
FIG. 22   FIG. 23
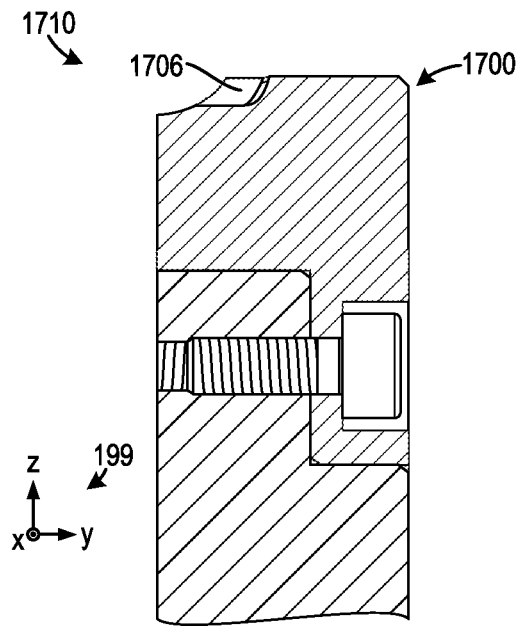
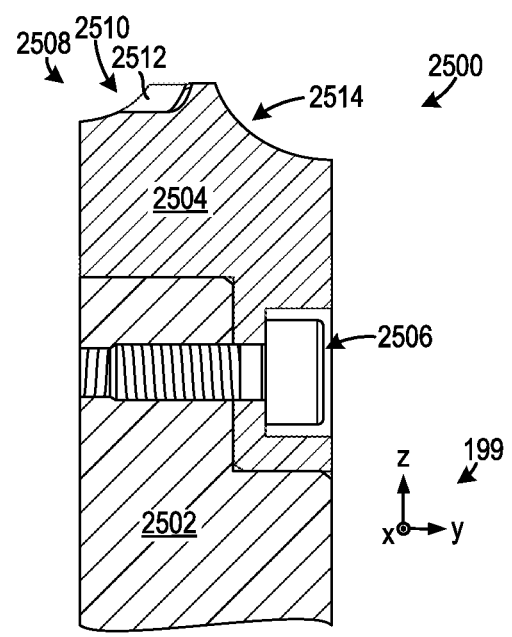
FIG. 24   FIG. 25

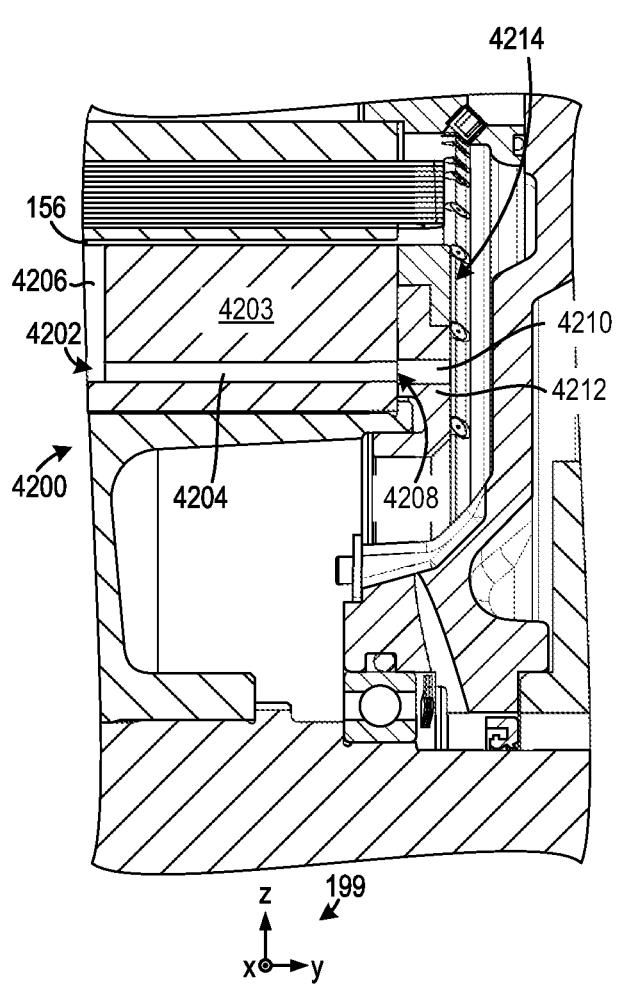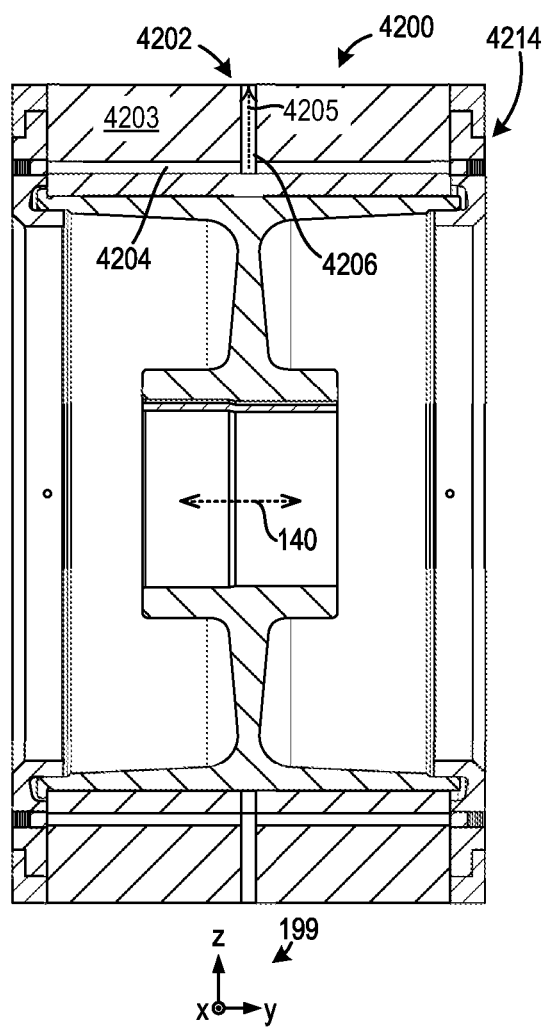
FIG. 42    FIG. 43
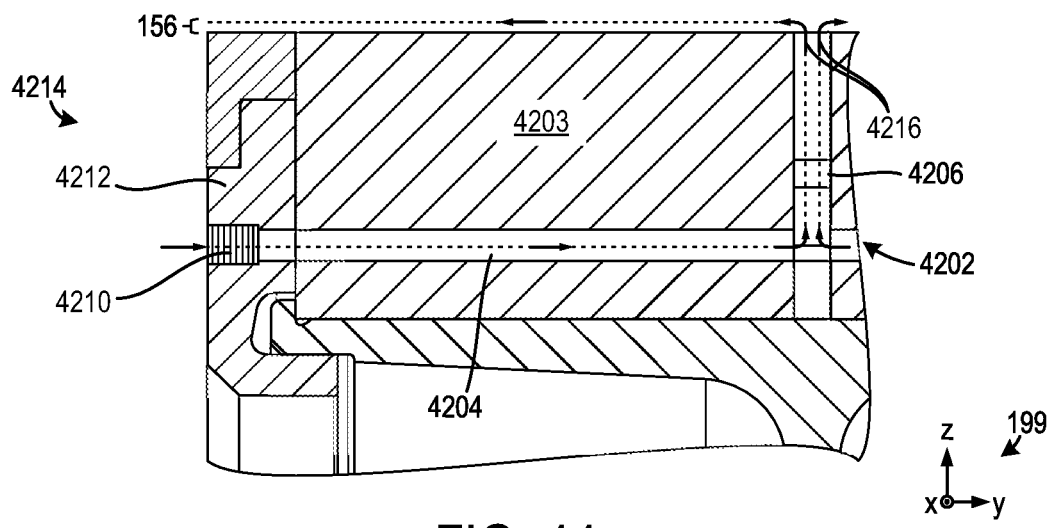
FIG. 44

VEHICLE PROPULSION UNIT WITH ELECTRIC MACHINE THAT INCLUDES A BALANCING PLATE ASSEMBLY AND METHOD FOR ASSEMBLING SAID ELECTRIC MACHINE

TECHNICAL FIELD

The present disclosure relates to a vehicle propulsion unit that includes an electric machine. The electric machine includes a balancing plate assembly that, during machine operation, provides sealing of the machine's air gap.

BACKGROUND AND SUMMARY

Some electric machines in vehicle drive units have an air gap between the rotor and stator to separate the rotating rotor from the stationary stator. Air gaps are typically sized by weighing factors such as manufacturing tolerances of the rotor and stator and the machine's electromagnetic performance. For instance, increasing the air gap decreases the chance of undesirable contact occurring between the rotor and the stator while decreasing motor efficiency.

To increase machine efficiency, some electric machines employ cooling systems that direct oil into interior areas of the machine to cool the stator and/or rotor. For instance, some electric machines are designed to spray or otherwise deliver oil to cool stator components such as the stator's end windings. Certain machines use balancing plates coupled to the rotor which are constructed out aluminum. These balancing plates provide multiple functions such as rotor stack retention and rotor balance. The balancing plate's proximity to the stator's end windings may be constrained by the stator's creepage distances.

The inventors have recognized several drawbacks with previous electric machines. For instance, the oil used for cooling may enter the air gap between the rotor and stator and cause drag losses which degrade machine performance. Further, the lack of smooth surfaces in the laminations of certain machines has caused impediments to air gap sealing in previous machines. Motor designers strive to maintain a creepage distance between the end windings and balancing plates to reduce the chance of (e.g., prevent) unwanted current flow between these parts. Further, certain motors may have relatively high rotor tip velocities (e.g., on the order of >100 meters per second m/s). This high tip speed presents additional barriers to adequately sealing the air gap.

The inventors have recognized the abovementioned challenges and developed an electromagnetic propulsion unit for a land-based wheeled or tracked vehicle to at least partially overcome the challenges. In one example, the electromagnetic propulsion unit includes a balancing plate assembly. In such an example, the balancing plate assembly includes an outer plate and is and is designed to couple to a rotor assembly. In some instances, the balancing plate assembly may include a base plate that is designed to retain a rotor lamination stack and couple to the outer plate. Further, in the abovementioned example, the outer plate includes a lip that is designed to, during rotor assembly rotation, pump one or more fluids from an air gap formed between the rotor assembly and a stator. Additionally, the one or more fluids may include air and oil, in one example. Consequently, the amount of oil in the air gap may be reduced, thereby increasing machine operating efficiency due to drag loss reductions. Even further, in such an example, the outer plate is constructed out of a non-electrically conductive material. Constructing the outer plate out of a non-conductive material permits a creepage distance to be maintained in the machine, while positioning a section of the balancing plate assembly closer to the air gap and the end windings than balancing plates solely constructed out of a metallic material. The close proximity between the outer plate and the air gap permits the flowrate of the fluid pumped through the air gap to be increased while also reducing the chance of ingress of fluids, such as oil, into the air gap from the axial ends of the stator assembly (e.g., near stator end windings).

To generate the pumping of the fluid(s) through the air gap, the lip may include a curved or a planar surface, in one example. Therefore, during rotation of the rotor assembly, the lip applies centrifugal forces on the one or more fluids adjacent to the lip. These centrifugal forces effectuate a pumping effect from the air gap. In other words, a lower pressure zone is created at or near the air gap's outlet to drive fluid flow through the air gap. Consequently, the amount of oil in the air gap is further reduced due to the reduction of oil ingress into the air gap as well as the fluid flow through the air gap, further increasing machine efficiency.

It should be understood that the summary above is provided to introduce in a simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 7-8 show different assembled views of the balancing plate assembly, depicted in FIG. 4.

FIG. 9 shows detailed view of a balancing plate assembly with an outer plate that includes an extended section.

FIGS. 22-23 show different assembled views of the balancing plate assembly, depicted in FIG. 17.

FIG. 24 shows a detailed cross-sectional view of the balancing plate assembly, depicted in FIG. 17.

FIG. 25 shows a detailed cross-sectional view of a balancing plate with an outer plate that includes multiple curved surfaces and ridges.

FIG. 42 shows a detailed cross-sectional view of another example of a balancing plate assembly and a rotor assembly with an air passage arrangement formed therein.

FIG. 43 shows a cross-sectional view of the rotor assembly and balancing plate assembly, depicted in FIG. 42.

FIG. 44 shows a detailed cross-sectional view of the balancing plate assembly and rotor assembly depicted in FIG. 42, particularly illustrating a flow path through the air passage arrangement.

FIGS. 1-59 and 61 are drawn approximately to scale. However, other relative component dimensions may be used, in other embodiments.

DETAILED DESCRIPTION

A vehicle electromagnetic propulsion unit with an electric machine is described herein. The electric machine generates fluid flow to pump air through the air gap for evacuation of fluids such as air and/or oil from the gap and reduces oil ingress into the air gap. This fluid flow through the air gap allows the electric machine's drag losses to be reduced, thereby increasing the machine's performance and efficiency. To effectuate this pumping action, balancing plate assemblies that attach to the rotor stack are provided in the electric machine. Each balancing plate assembly may include a non-electrically conductive outer plate and/or an inner plate, referred to herein as a base plate. The outer plate is profiled with a lip that, during rotor rotation, applies centrifugal forces on nearby fluid due to viscous forces. The centrifugal forces effectuate the flow of fluids such as air and oil through the air gap. In this way, the balancing plate assembly functions as a centrifugal pump. Various contours of the lips may be used to generate the aforementioned centrifugal forces, such as lips with flat, curved, or bladed contours. The profile of the lip may be selected to achieve a targeted amount of fluid flow through the air gap and may be dependent on the size of the air gap, the type and layout of the machine's cooling system, the machine's intended operating environment, and other factors or machine design goals. The fluid flow pattern generated by the lip of the outer plate not only allows fluid(s) to flow through the air gap, to reduce the amount of oil in the air gap, for instance, but reduces the likelihood of oil entering the air gap. This significantly reduces the amount of oil in the air gap when compared to previous oil cooled motors, thereby decreasing drag losses and increasing machine efficiency and performance.

Figure 1:
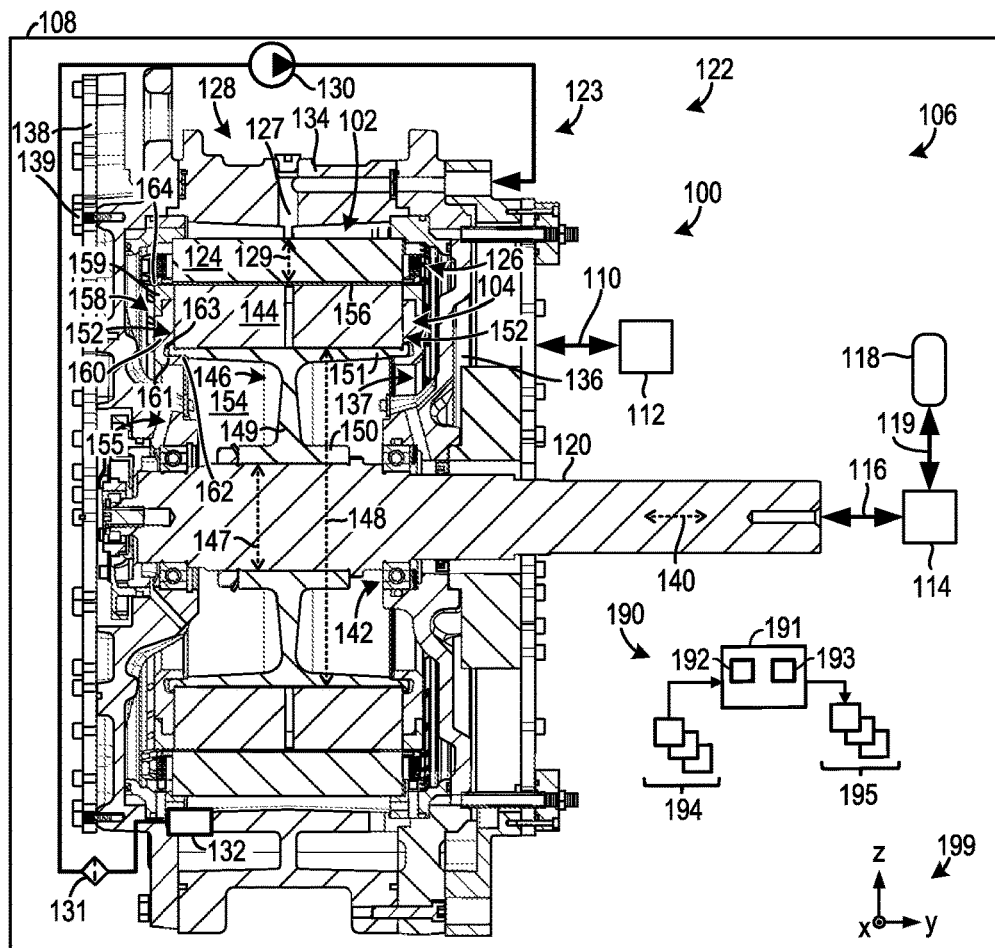
FIG. 1 shows a cross-sectional view of a vehicle propulsion unit that includes an electric machine with a first example of a balancing plate assembly.

FIG. 1 shows an electric machine 100 (e.g., an electric motor such as a motor-generator). As such, the electric machine 100 may be designed to generate mechanical power, as well as electric power during a regeneration mode, in some cases. To achieve this functionality, a stator assembly 102 and a rotor assembly 104 are provided.

The electric machine 100 is included in an electromagnetic propulsion unit 106 of a vehicle 108 such as a land-based wheeled vehicle or a tracked vehicle. The electromagnetic propulsion unit 106 may additionally include a gearbox, an inverter, and/or other suitable components for generating motive power. More generally, arrows 110 indicate the transfer of electrical power between an electric power source 112 (e.g., an inverter, an energy storage device, combinations thereof, etc.) and the electric machine 100. In examples where the propulsion unit includes an inverter, the electric machine may be a multi-phase alternating current (AC) electric machine. However, numerous suitable types of electric machines, including direct current (DC) electric machines, have been contemplated, in other examples. For instance, the electromagnetic propulsion unit 106 may be included in an electric axle or, alternatively, may be included in a drive system where the motor and/or transmission are spaced away from the drive axle. To provide mechanical power to desired components in the vehicle, the electric machine may be coupled to a downstream component 114 via an output shaft and/or other suitable mechanical component, represented by an arrow 116. The component 114 may be a transmission, a gearbox in an electric axle, a differential, and the like that is coupled to one or more drive wheel(s) 118. Arrows 119 indicate the mechanical connection between the component 114 and the drive wheel(s) 118. Thus, the drive wheel propels the vehicle when receiving power from the upstream components. In other examples, the component 114 may be coupled to two or more wheels that drive a continuous track.

The vehicle 108 may take a variety of forms, in different embodiments, such as a light, medium, or heavy duty vehicle that may be designed for on-road and/or off-road use and, as indicated above, may be a land-based wheeled or tracked vehicle. In some examples, in addition to the electric machine 100, the vehicle 108 may further include another motive power source, such as an internal combustion engine (ICE) (e.g., a spark and/or compression ignition engine) or other suitable devices designed to generate rotational energy. The internal combustion engine may include conventional components such as cylinders, pistons, valves, a fuel delivery system, an intake system, an exhaust system, and the like. Thus, the electromagnetic propulsion unit 106 with the electric machine 100 may be utilized in an electric vehicle (EV) such as a hybrid electric vehicle (HEV) or a battery electric vehicle (BEV).

The rotor assembly 104 and the stator assembly 102 during machine operation electromagnetically interact to rotate a rotor shaft 120, in a motor mode, and generate electrical energy in a regenerative mode, when the machine is designed with regeneration functionality.

The electric machine 100 may further include a cooling system 122. The cooling system 122 may include an oil circuit 123 that is designed to flow oil through a stack 124 of stator laminations and/or towards end windings 126 in the stator assembly 102. The oil circuit 123 is shown including an oil passage 127 that extends through a housing 128 for delivering oil to passages in the stack 124 near an axial mid-line 129 of the stack. However, numerous oil passage layouts are possible. For instance, the oil circuit 123 may include oil inlets and outlets at opposing axial ends of the lamination stack and/or oil jets that direct oil toward end windings 126. A pump 130, an oil filter 131, and a sump 132, schematically depicted in FIG. 1, may further be included in the oil circuit 123 of the cooling system. The pump 130 is designed to drive oil flow in the oil circuit and may include conventional components such as one or more of a pumping chamber, a piston, an inlet, an outlet, vanes, gears, rotors, etc. Additionally, or alternatively, the cooling system may include a water jacket that surrounds or is otherwise incorporated into the housing 128.

The housing 128 may include a body 134 and sections 136 that attach thereto via fasteners and/or other suitable attachment apparatuses. Thus, the housing 128 may include a substantially sealed cavity 137 in which the rotor assembly 104 and the stator assembly 102 are positioned. The housing 128 may further include end plates 138 that are coupled via fasteners 139 and/or other suitable mechanisms to the housing sections 136.

As indicated above, the stator assembly 102 may include the stack 124 of laminations (e.g., laminated plates pressed together to form the stack). The stator assembly 102 may further include the end windings 126 that axially extend outward from the lamination stack 124. The end windings 126 may be constructed out of an electrically conductive material such as copper.

The rotor assembly 104 may include the rotor shaft 120 that during machine operation rotates about an axis 140. It will be appreciated that the balancing plate assemblies 158, discussed in greater detail herein, also rotate about the axis 140. The rotational axis 140 is additionally provided in FIGS. 2-59 for reference, when appropriate. Bearings 142 may be coupled to the rotor shaft 120 that support the shaft and facilitate rotation thereof. The bearings 142 and other bearings described herein may include inner and outer races and roller elements (e.g., spherical balls, cylinders, tapered cylinders, and the like). The rotor assembly 104 further includes a rotor stack 144. The rotor stack 144 may include rotor laminations and, in the case of a permanent magnet type machine, permanent magnets embedded therein. However, numerous types of rotor stack designs have been envisioned.

The rotor assembly 104 may further include a rotor hub 146 that is profiled to attach to the rotor shaft 120 at its inner diameter 147 and attach to the rotor stack 144 at its outer diameter 148. In alternative examples, the rotor hub may be omitted from the machine and the rotor lamination stack may be directly coupled to the rotor shaft 120. The hub 146 may include a radial rotor section 149 that extends between an inner section 150 of the hub that is coupled to the rotor shaft 120 and an outer section 151 of the hub that is coupled to the rotor stack 144. Specifically, the inner section 150 may extend along and couple to a length of the rotor shaft 120. The outer section 151 may extend along at least a portion of the rotor stack 144. In particular, the outer section 151 may extend between opposing axial sides 152 of the rotor stack 144 and include extensions that are outboard of the rotor stack 144. However, other profiles of the rotor hub 146 have been contemplated. The radial rotor section 149 may have a smaller thickness (measured in an axial direction) than the inner section 150 and/or outer section 151. In particular, the radial rotor section 149 may be constructed as a spider with arms that extend between the inner and outer sections 150 and 151. Cavities 154 may therefore be positioned between the inner section 150 and the outer section 151. In this way, the rotational mass of the rotor assembly 104 may be reduced, thereby increasing motor efficiency. However, in other examples, the radial rotor section may have a different profile. Further, the cavities 154, which may include a resolver cavity, may be included in machine end-space 155. The machine end-space 155 may have less, and in some cases substantially no oil, than the oil cooled sections of the machine such as the space around the end windings. To elaborate, the machine end space, and specifically the resolver cavity, may have a drain incorporated therein that reduces the amount of oil in the space by evacuating oil therefrom. This drain may be in fluidic communication with the cooling system's sump. Further, the radial rotor section 149 may taper in a radially outward direction, to further decrease rotor mass.

An air gap 156 is formed between the stator assembly 102 and the rotor assembly 104. Specifically, the air gap 156 is formed between the lamination stack 124 and the rotor stack 144 and extends from opposing axial sides 152 of the stator and rotor stacks. The air gap 156 permits the rotor to rotate and the rotor and stator to electromagnetically interact in a desired manner. The air gap 156 may include one or more fluids flowing therethrough. These fluids may include air and oil, for instance. The flow of these fluids through the air gap is expanded upon herein with regard to FIGS. 2 and 9.

The electric machine 100 further includes the balancing plate assemblies 158. In the illustrated example, the balancing plate assemblies 158 are positioned on opposing sides of the rotor stack. However, in other examples, a single balancing assembly may be positioned on one side of the rotor stack. The balancing plate assemblies 158 function to retain the rotor stack 144, balance the rotor assembly 104, as well as generate airflow through the air gap 156. Specifically, the balancing plate assemblies fixate the rotor stack 144 to the rotor shaft 120. The airflow generation of the balancing plate assembly is elaborated upon herein. Each of the balancing plate assemblies 158 may include an outer plate 159 (e.g., an outer ring) and a base plate 160. However, one-piece balancing plate assemblies or assemblies having three or more plates may be used in other embodiments. The base plate 160 may be coupled to the rotor stack 144 via bolts, screws, other suitable attachment devices, welds, adhesive(s), press-fitting, combinations thereof, and the like. The base plate 160 may include an inner section 161 that extends along an interior surface 162 of the outer section 151 of the hub 146. Thus, the outer section 151 may extend into a recess 163 in the base plate 160. However, other base plate contours may be used, in other examples.

The base plate 160 may be constructed out of a non-magnetic material such as aluminum, an aluminum alloy, and the like. Conversely, the outer plate 159 may be constructed out of non-electrically conducive material such as a polymer (e.g., polyether ether ketone (PEEK), polyethylene (PE), polyurethane (PU), phenol formaldehyde resins (PF), polyimide (PI), a coated polyamide, nylon, polyoxymethylene (POM), and the like). Constructing the outer plate out of a non-electrically conductive material allows the plate to be positioned closer to the air gap 156 while maintaining a creepage distance 200 (depicted in FIG. 2) between the end windings 126 and the base plate 160, which may be constructed out of an electrically conductive material. It will be understood that the creepage distance 200 is a distance between two components that inhibits electric current flow between the components. In one specific use-case example, the creepage distance between the end windings and the base plate may be 5 millimeters (mm), although numerous creepage distances are possible and may be dependent on several machine design characteristics.

Continuing with FIG. 1, the outer plate 159 includes a lip 164 that is designed to apply centrifugal forces on the surrounding fluid(s) and drive pumping action that moves the fluid(s) through the air gap 156, during rotor rotation. This flow pattern generated by the outer plate's lip 164 also decreases the amount of oil ingress into the air gap. The machine's performance and efficiency are consequently increased.

A control system 190 with a controller 191 may further be included in the system. The controller may include a processor 192 and memory 193 with instructions stored therein that, when executed by the processor, cause the controller to perform various methods and control techniques described herein. The processor may include a microprocessor unit and/or other types of circuits. The memory 193 may include known data storage mediums, such as random access memory, read only memory, keep alive memory, combinations thereof, and the like.

The controller 191 may receive various signals from sensors 194 positioned in the electric machine 100 and/or elsewhere in the system. Conversely, the controller 191 may send control signals to various actuators 195 at different locations in the system based on the sensor signals. For instance, the controller 191 may send command signals to the pump 130 and, in response, the actuator(s) in the pump(s) may be adjusted to alter the pump's flowrate. In other examples, the controller may send control signals to the electric machine 100 and, responsive to receiving the command signals, the machine may be adjusted to alter its speed and/or an amount of electrical energy the machine generates in a regeneration mode. The other controllable components in the system may be operated in a similar manner with regard to sensor signals and actuator adjustment.

Figure 2:
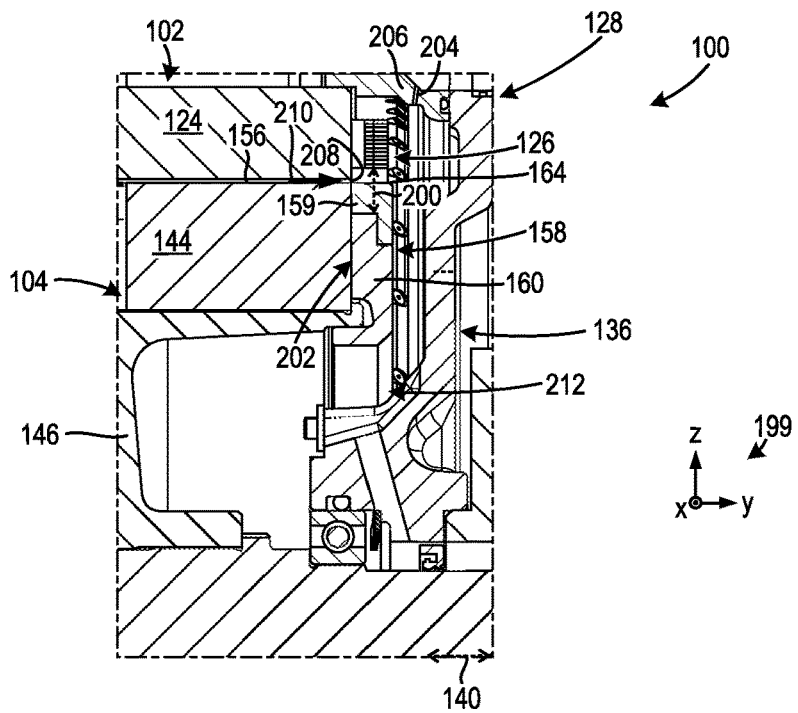
FIG. 2 shows a detailed view of a section of the electric machine, depicted in FIG. 1, that includes a rotor stack and a balancing plate assembly.
Figure 61:
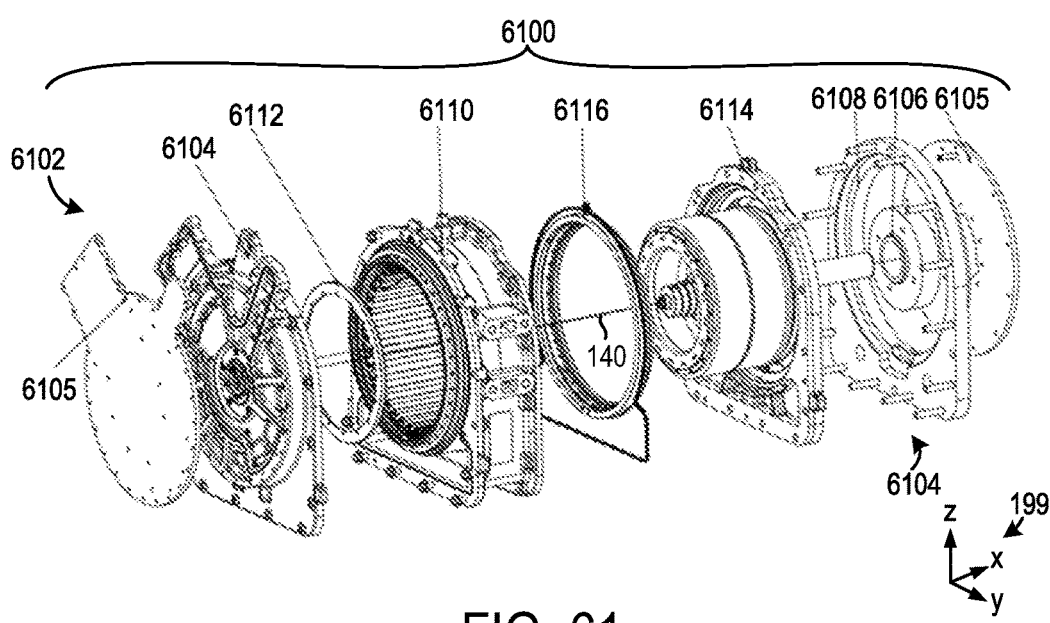
FIG. 61 shows an example of an electric machine for an electromagnetic propulsion unit in a vehicle.
Figure 59:
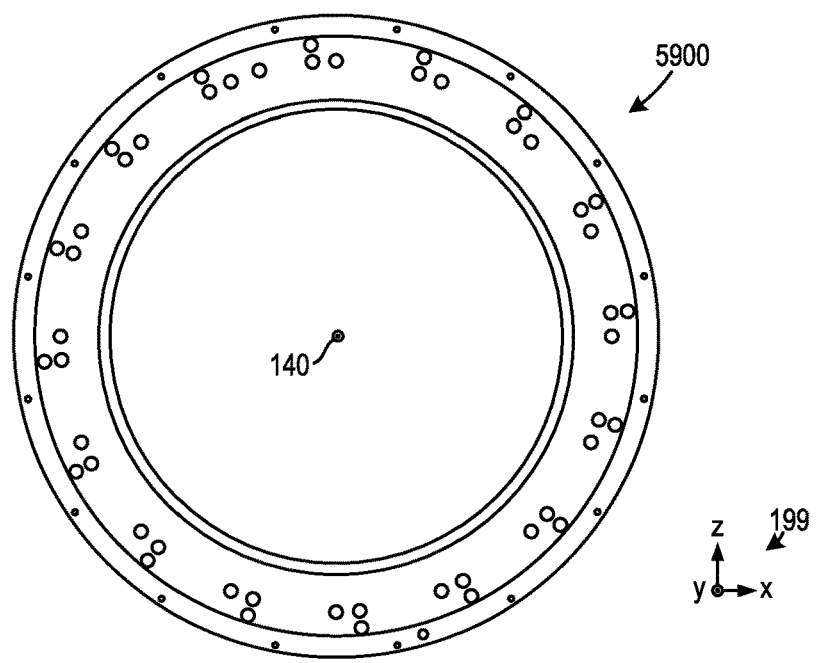
FIGS. 57-59 show examples of base balancing plates that may be included in an electric machine product line.

An axis system 199 is provided in FIG. 1, as well as FIGS. 2-59 and 61, when appropriate for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. Further, a rotational axis 140 of the machine is provided for reference in FIG. 1 as well as FIGS. 2-59 and 61 when appropriate, for reference. Axial direction and distances may be measured along the rotational axis or axes parallel to the rotational axis 140. Further, it will be understood that radial directions may be axes perpendicular to the rotational axis. The cutting plane that defines the cross-sectional view of FIG. 1 as well as the other cross-sectional view depicted herein extends through the rotational axis 140.

FIG. 1 shows a first example of the balancing plate assemblies 158 coupled to the rotor stack 144. However, it will be understood that the other balancing plate assembly examples described herein may be incorporated into an electric machine that shares similar functional and/or structural characteristics.

FIG. 2 shows a detailed view of an interface 202 between the balancing plate assemblies 158 and the rotor assembly 104 in the electric machine 100. The stator assembly 102 with the lamination stack 124 and the end windings 126 is again shown along with the rotor stack 144, the rotor hub 146, as well as one of the housing sections 136.

An oil passage 204 may extend through a housing section 206 that may be profiled to spray oil towards the end windings 126 for stator cooling. This cooling permits the machine's operating efficiency to be increased. The oil passage 204 may receive oil from oil cutouts that extend through the stator laminations in the stack 124. However, in alternate examples, the oil passage 204 may receive oil from an oil line that extends through sections of the machine housing 128.

As previously discussed, the lip 164 of the outer plate 159 applies centrifugal forces on the fluid(s) surrounding the lip and specifically near an outlet 208 of the air gap 156, due to the viscous forces. This centrifugal force application effectuates the pumping of fluid(s) (e.g., air and/or oil such as a mixture of air and oil droplets), through the air gap 156. Specifically, the fluid flow may be generally in a direction (indicated via arrow 210) that extends axially outward such that the fluid is expelled axially outward from the air gap 156. To generate this fluid flow, an outer surface of the lip 164 may be straight in an axial direction but circumferentially extends around the rotational axis 140 to form a ring like shape. However, curved and bladed type outer plate lips have been contemplated and are explained in greater detail herein.

The outer plate 159 is shown including an outer diameter that is positioned radially inward from the end windings 126. As previously discussed the creepage distance 200 between the base plate 160, which may be electrically conductive, and the end windings 126 may be maintained while the outer plate is positioned closer to the air gap outlet and the end windings, consequently. Further, the base plate 160 may include an opening 212 in which one of the housing sections 136 extends.

Figure 3:
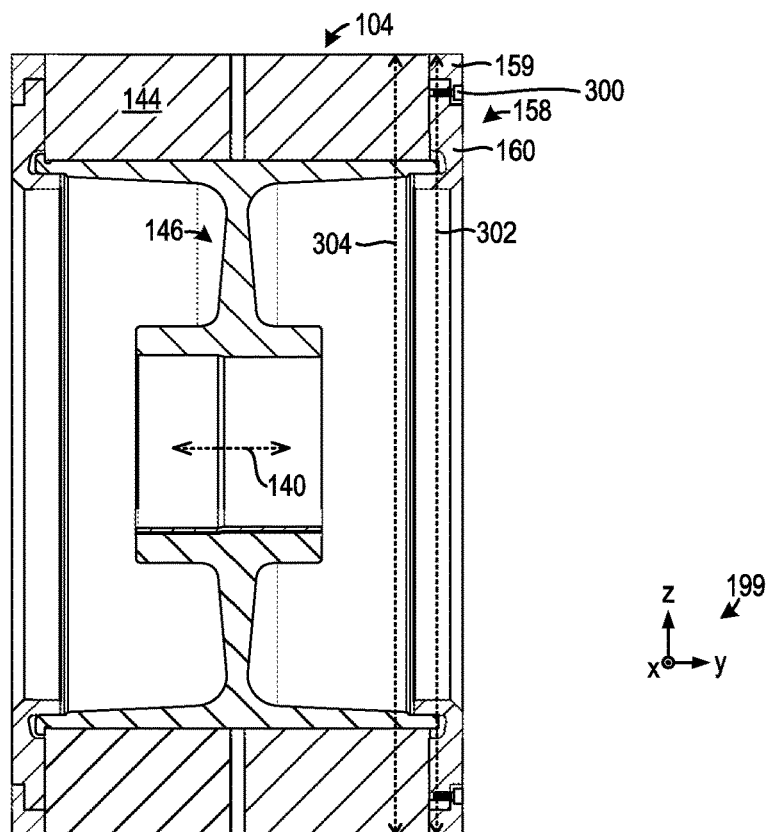
FIG. 3 shows a cross-sectional view of the rotor assembly and the balancing plate assembly in the electric machine, depicted in FIG. 1.

FIG. 3 shows a detailed view of the rotor assembly 104 and the balancing plate assemblies 158. Again, the rotor stack 144, rotor hub 146, outer plate 159, and base plate 160 are illustrated. Attachment devices 300 are shown coupling the outer plate 159 to the base plate 160. Further, the outer plate's outer diameter 302 may be similar to the outer diameter 304 of the rotor stack 144. However, in other examples, the outer diameter of the outer plate 159 may be greater than the outer diameter of the rotor stack 144. Increasing the outer diameter of the outer plate in this manner may increase the plate's sealing capabilities.

Figure 4:
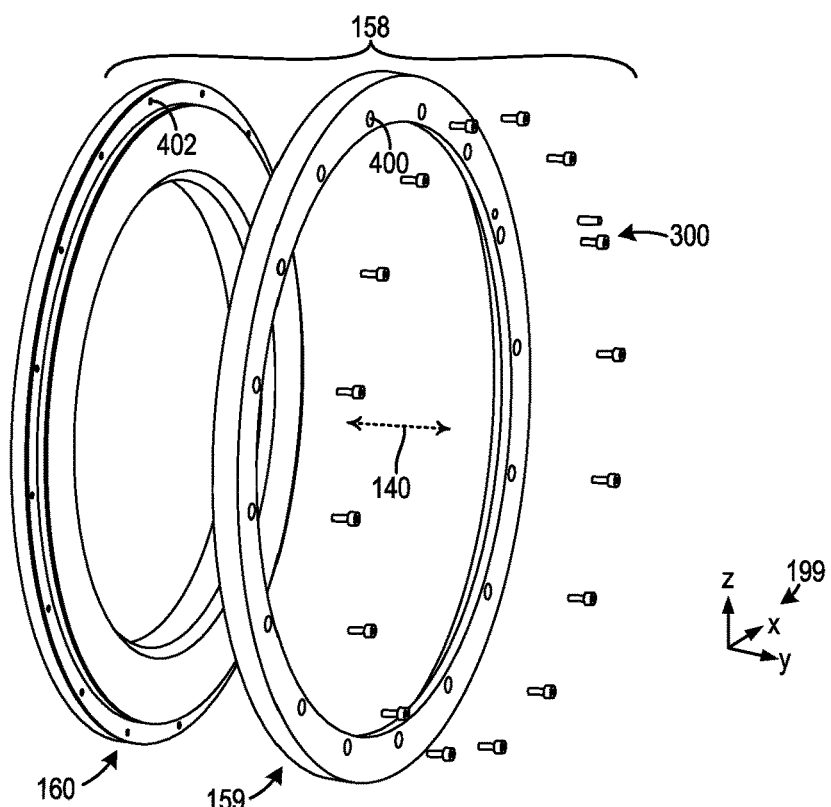
FIG. 4 shows an exploded view of the balancing plate assembly in the electric machine, depicted in FIG. 1.

FIGS. 4-9 show one of the balancing plate assemblies 158, according to one example. Specifically, FIG. 4 shows an exploded view of the balancing plate assembly 158 with the outer plate 159, the base plate 160, and the attachment devices 300. When assembled, attachment devices 300 may extend through openings 400 in the outer plate 159 and thread or otherwise attach to threaded bores 402 in the base plate 160.

Figure 5:
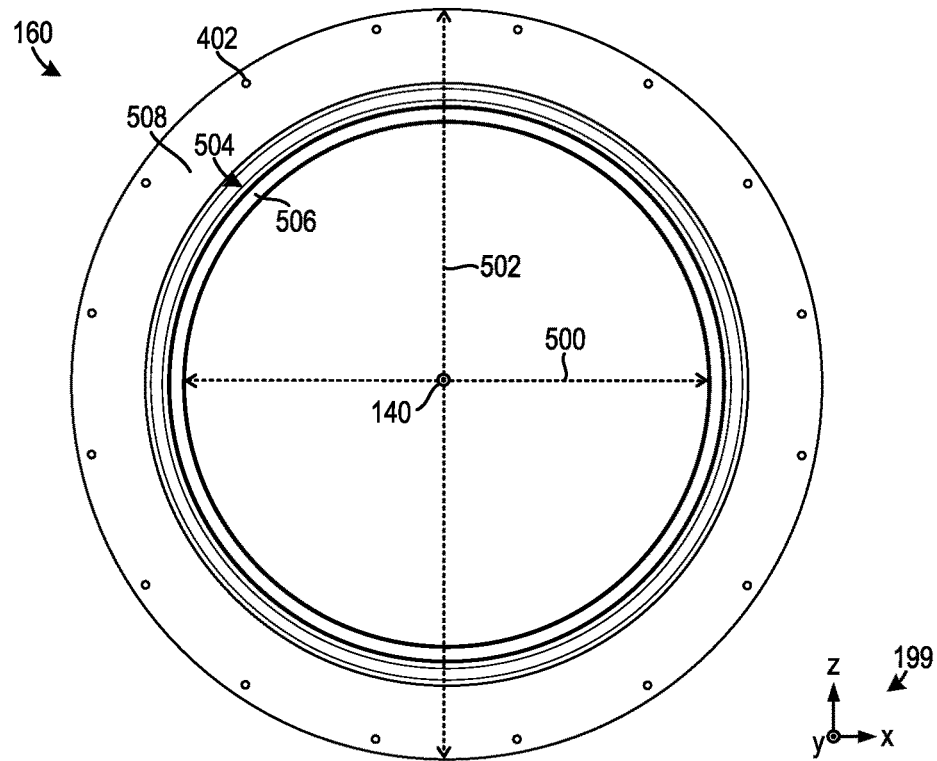
FIG. 5 shows an elevation view of a base plate included in the balancing plate assembly, depicted in FIG. 4.

Turning to FIG. 5, a detailed elevation view of the base plate 160 is illustrated. The base plate 160 may be shaped with an inner diameter 500 and an outer diameter 502, thereby forming an annular shape. However, the base plate may have other profiles in alternate embodiments.

The base plate 160 may include a flange 504 formed via a thicker inner section 506 and a thinner outer section 508, in relation to an axial direction. This flange 504 may be designed to mount the base plate on the rotor hub. Further, when the balancing plate assembly is assembled, the outer plate may be positioned on the outer diameter 502 of the base plate 160. However, the base and outer plate may form an interface with a different geometric design, in other examples. The threaded bores 402 in the base plate are also depicted in FIG. 5.

Figure 6:
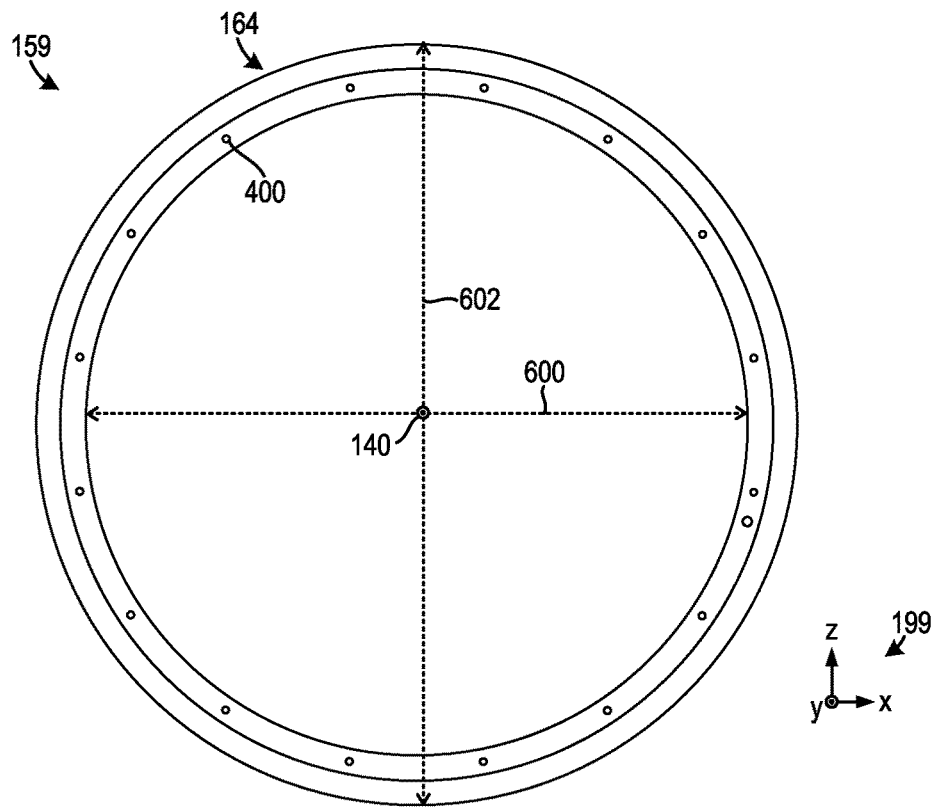
FIG. 6 shows an elevation view of an outer plate included in the balancing plate assembly, depicted in FIG. 4.

Turning to FIG. 6, a detailed elevation view of the outer plate 159 is illustrated. The outer plate 159 includes an inner diameter 600 and an outer diameter 602. The outer diameter 602 of the outer plate 159 may be greater than the outer diameter 502 of the base plate 160, shown in FIG. 5, to permit the lip 164 of the outer plate 159 to be positioned closer to the air gap. The openings 400 in the outer plate 159 are again illustrated. The openings 400, as well as the bores 402, may circumferentially extend around the plate and may be equally spaced with regard to one another. Alternatively, other arrangements of the openings and/or bores with unequal spacing have been contemplated, in other examples.

FIGS. 7-8 show different assembled views of the balancing plate assembly 158. Cutting plane 8-8, shown in FIG. 7 indicates the cross-sectional view shown in FIG. 8. The outer plate 159 and the base plate 160 are attached to one another, and as shown in FIG. 8, stepped interface is formed between the two plates to permit the plates to be spaced efficiently attached to one another while maintaining a desired positioning.

FIG. 9 shows a detailed view of one of the balancing plate assemblies 158 whose outer diameter 602 is extended radially outwards. Specifically, the outer diameter 602 of the outer plate 159 has been increased such that an extended section 900 projects radially across the outlet 208 of the air gap 156. Thus, the outer diameter of the extend section may be greater than an inner diameter of the stator stack 124. In this way, the air gap sealing may be increased. The size of the outer diameter of the outer plate 159 may be selected based on desired sealing targets for the electric machine. For instance, in some examples, the outer diameter of the outer plate may be greater than the outer diameter of the rotor stack but less than the inner diameter of the stator lamination stack. Arrow 210 again shows the general direction of fluid flow through the air gap 156. Arrow 901 shows the general direction of fluid flow (e.g., air and/or oil flow) from the air gap outlet 208. Thus, air and oil may be directed towards the stator's end windings, providing greater stator cooling and increasing machine efficiency.

The extended section 900 may include a straight surface 902 (in relation to an axial direction). However, in other examples, the surface 902 may be angled with regard to a radial axis. The angular arrangement of the surface 902 may be selected based on desired flow dynamics for the machine's intended end-use operating environment.

Attachment device 300 is shown extending through the opening 400 in the outer plate 159 and threading into the threaded bore 402 in the base plate 160. In this way, the outer plate may be efficiently attached to the base plate, although additional or alternative suitable attachment techniques may be used in other examples, such as clamping mechanisms, welding, and the like. Further, in one example, the attachment device may thread into the rotor assembly 104 (e.g., the rotor stack 144). In additional or alternative examples, the base plate may be pressed onto the rotor hub. Still further, in other examples, the plates in the balancing plate assembly may be interconnected by one or more long attachment apparatuses (e.g., bolts) that extends through the rotor lamination stack. In yet other examples, the base plate may be fixed to the hub through circlips and/or a lock nut. Additionally, the base plate may also be designed like a lock nut, such that it is turned onto the rotor hub.

Figure 10:
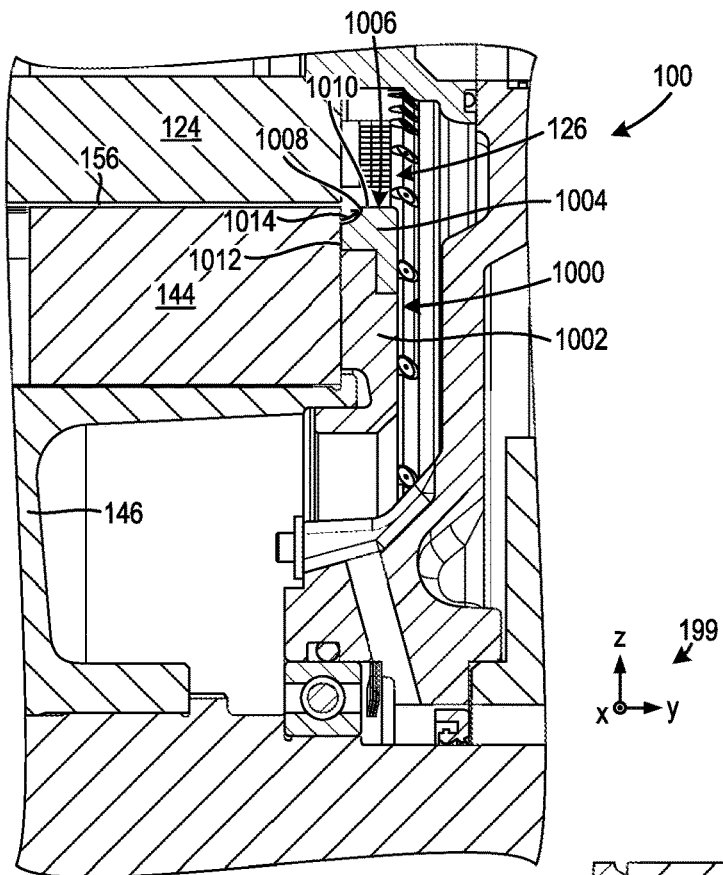
FIG. 10 shows another example of a rotor assembly and a balancing plate assembly with an outer plate having a curved section.

FIG. 10 shows another example of a balancing plate assembly 1000. The different examples of balancing plate assemblies described herein are shown included in an electric machine, similar to the electric machine 100, shown in FIGS. 1-2. Therefore, similar components such as the stator stack 124, the rotor stack 144, and the rotor hub 146 are similarly numbered. The balancing plate assembly 1000 again includes a base plate 1002 and an outer plate 1004. The outer plate 1004, in the example depicted in FIG. 10, includes a lip 1006 with a curved surface 1008 (e.g., concave surface). The curved surface 1008 connects an outer surface 1010 and an axial inboard surface 1012. The curved surface 1008 again generates fluid flow axially outward through the air gap 156.

To elaborate, the curved surface 1008 of the lip 1006 acts as a compressor, based on viscous friction forces. Due to viscous friction, the fluid along the lip curvature is forced to rotate, which results in a centrifugal force. As a result, the fluid is flowing radially over the sealing lip. The pressure build-up is lower when compared to the sealing lip with ridges (discussed in greater detail herein), so as to reduce the likelihood of (e.g., prevent) high pressure in the end space. Due to the lip being in close proximity to the air gap 156, trapped oil in the air gap is pumped out by creating a lower pressure near the air gap outlet. Moreover, the flow pattern over the lip curvature will disturb the inflow of oil from the end space towards the end windings 126, thereby increasing end winding cooling. Arrow 1014 depicts the general direction of fluid flow across the curved surface 1008.

Figure 11:
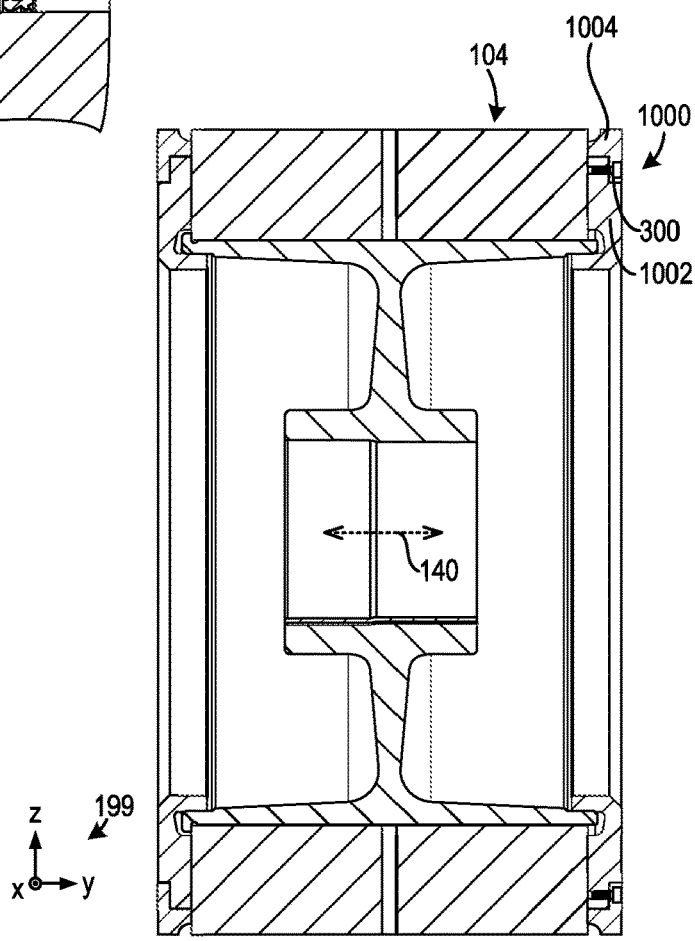
FIG. 11 shows a cross-sectional view of the rotor assembly and the balancing plate assembly, depicted in FIG. 10.

FIG. 11 shows another view of the balancing plate assembly 1000 and the rotor assembly 104. Attachment devices 300 are again shown coupling the outer plate 1004 to the base plate 1002.

Figure 12:
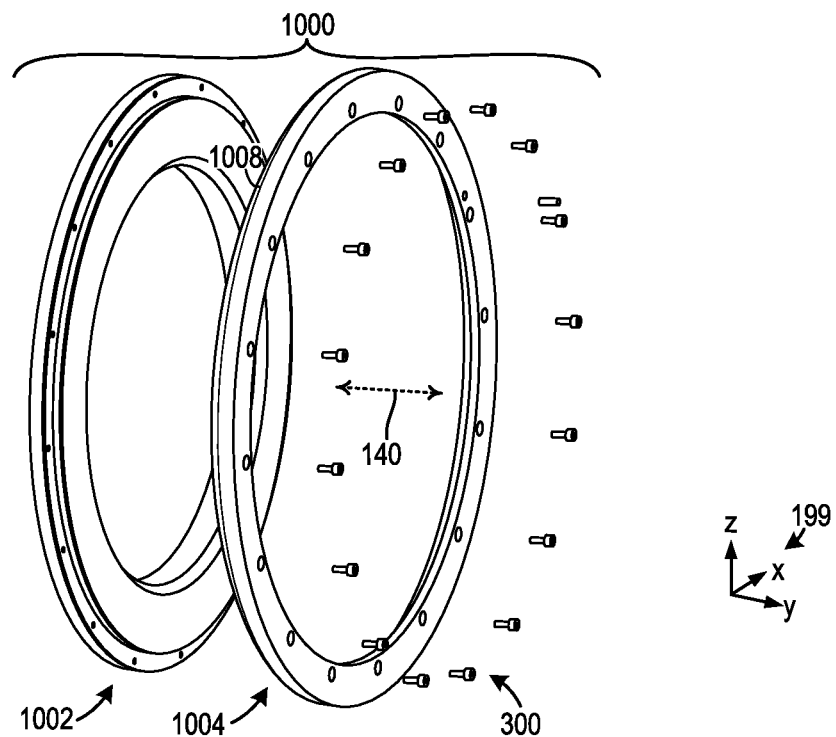
FIG. 12 shows an exploded view of the balancing plate assembly, depicted in FIG. 10.

FIG. 12 shows an exploded view of the balancing plate assembly 1000. The outer plate 1004, base plate 1002, and attachment devices 300 are depicted. The curved surface 1008 in the outer plate 1004 is again shown.

Figures 13, 14:
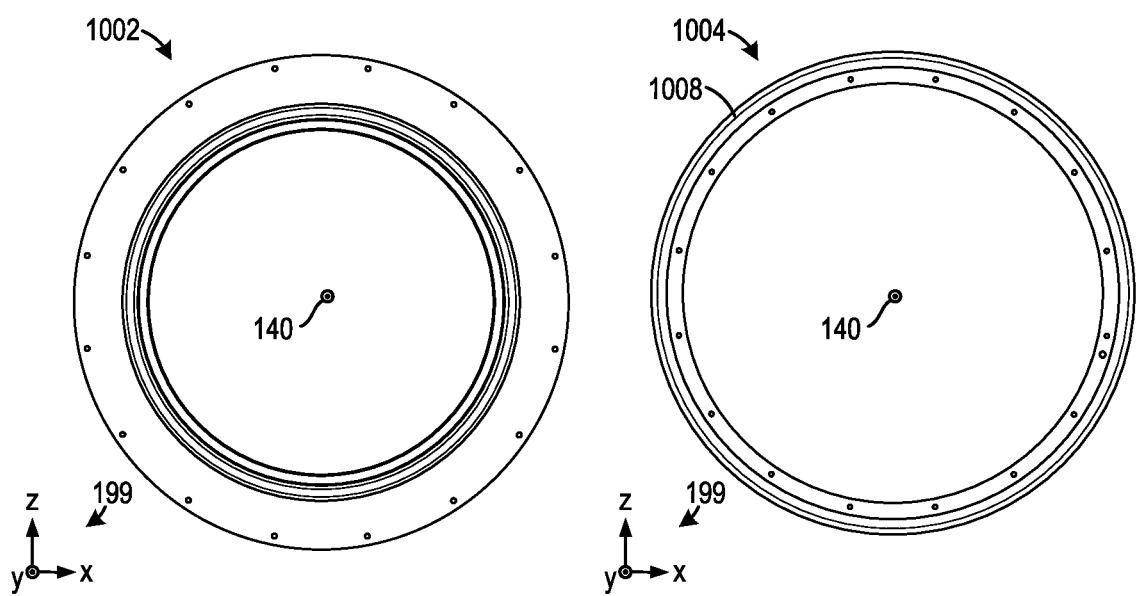
FIG. 13 shows an elevation view of a base plate included in the balancing plate assembly, depicted in FIG. 10.
FIG. 14 shows an elevation view of an outer plate included in the balancing plate assembly, depicted in FIG. 10.

FIGS. 13-14 show detailed elevation views of the base plate 1002 and the outer plate 1004. FIG. 14 specifically illustrates the lip's curved surface 1008 that may circumferentially surround the outer plate 1004.

Figure 15:
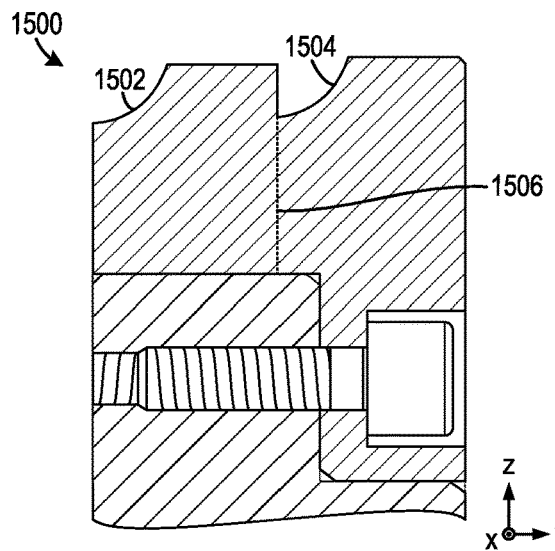
FIGS. 15-16 show detailed views of outer plates in exemplary balancing plate assemblies that include multiple curved sections on the outer plate.
Figure 16:
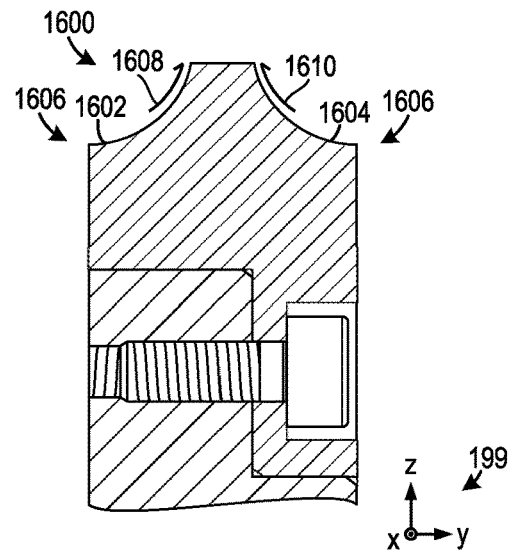

FIGS. 15-16 show different examples of an outer plate (designed for a balancing plate assembly) with additional curved surfaces. Turning specifically to FIG. 15, an outer plate 1500 includes a first curved surface 1502, similar to the previously described outer plate curved surface, and a second curved surface 1504 near an axial midline 1506 of the plate, although other positions of the second surface have been contemplated. Using multiple curved surfaces in the outer plate 1500 allows additional air gap sealing to be achieved, thereby reducing the amount of oil in the air gap to further increase machine efficiency. Both of the first and second curved surfaces 1502, 1504 may have a similar size and shape, in one example. Alternatively, the size and/or shape of these curved surfaces may be varied to achieve a desired flow pattern.

FIG. 16 specifically depicts an outer plate 1600 with a first curved surface 1602 and a second curved surface 1604 that are positioned on axially opposing sides 1606 of the outer plate but may have a similar size and shape. Positioning the second curved surface in this manner enables the fluid flow across the surface to be reversed with regard to the first curved surface, thereby increasing the sealing effect for the air gap. Arrow 1608 indicates the general direction of fluid flow across the curved surface 1602, and arrow 1610 indicates the general direction of fluid flow across the curved surface 1604. The fluid flow across the curved surface 1602 effectuates the pumping of air and oil from the air gap, and the fluid flow across the curved surface 1604 creates additional sealing effect for the air gap. In other words, the pumping force may be a consequence of viscous interaction between the air and oil mixture and the lip. Further, flow from both of the curved surfaces is direct toward the end windings. Therefore, using multiple curved surfaces at the lip may create an additional flow barrier, disturb the air flow near the air gap, and direct the oil from the air gap to multiple locations on the end windings.

Figure 17:
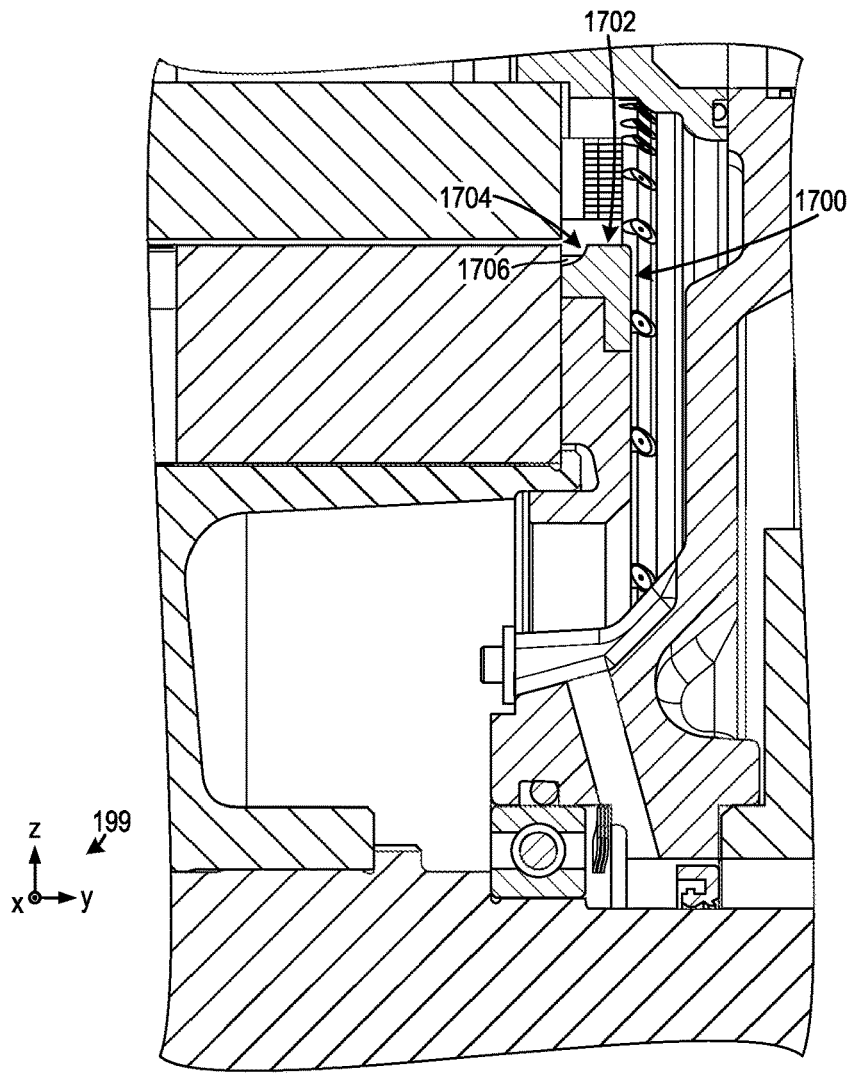
FIG. 17 shows yet another example of a rotor assembly and a balancing plate assembly that includes an outer plate with a curved surface and ridges formed thereon.

FIG. 17 shows another example of an outer plate 1700 that again includes a lip 1702 with a curved surface 1704. However, in the exemplary plate shown in FIG. 17, the lip 1702 includes axially extending ridges 1706 (e.g., blades). These ridges further increase the amount of oil drawn out of the air gap due to the increase pumping force that is effected by the ridges. Specifically, the ridges 1706 are show extending axially along and radially outward from the curved surface 1704 of the lip 1702. Profiling the ridges in the manner enables them to act as a radial compressor, therefore creating an air flow along their lengths, and creating a lower pressure environment around the air gap outlet. Moreover, the flow pattern over the ridges may disturb the inflow of oil from the end space towards the air gap. Consequently, pumping of air and oil through the air gap may be further increased, and oil ingress into the air gap may be further reduced.

Figure 18:
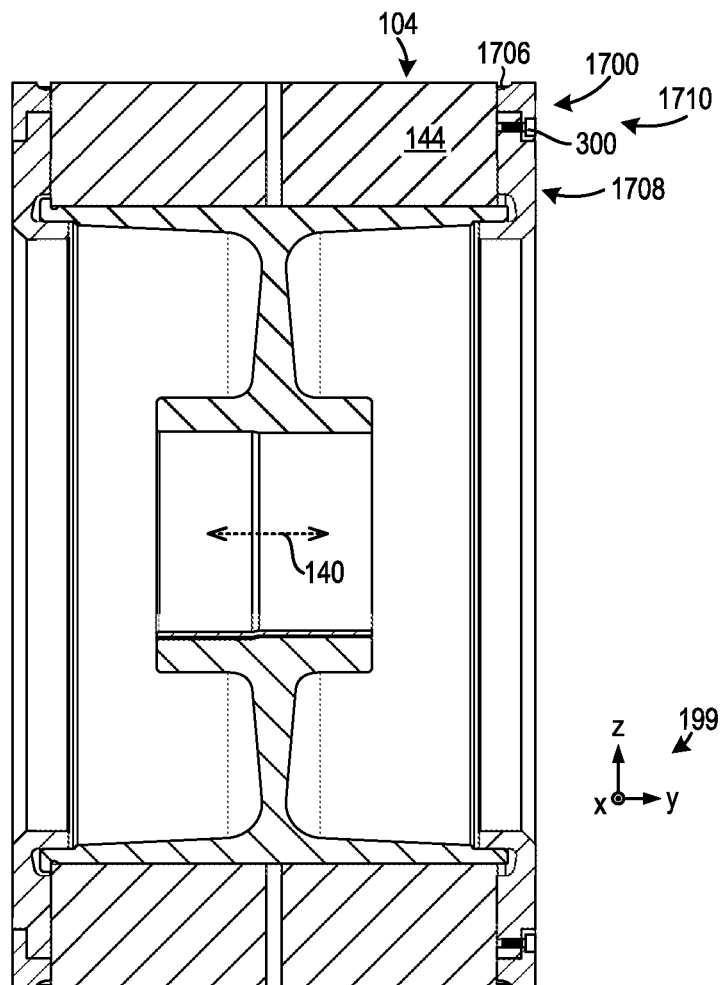
FIG. 18 shows a cross-sectional view of the rotor assembly and the balancing plate assembly, depicted in FIG. 17.

FIG. 18 shows another detailed view of the outer plate 1700 with the ridges 1706 coupled to the rotor stack 144 in the rotor assembly 104. Attachment devices 300 are again shown coupling the outer plate 1700 and a base plate 1708 to the rotor stack 144. Again, the plates 1700 and 1708 form a balancing plate assembly 1710.

Figure 19:
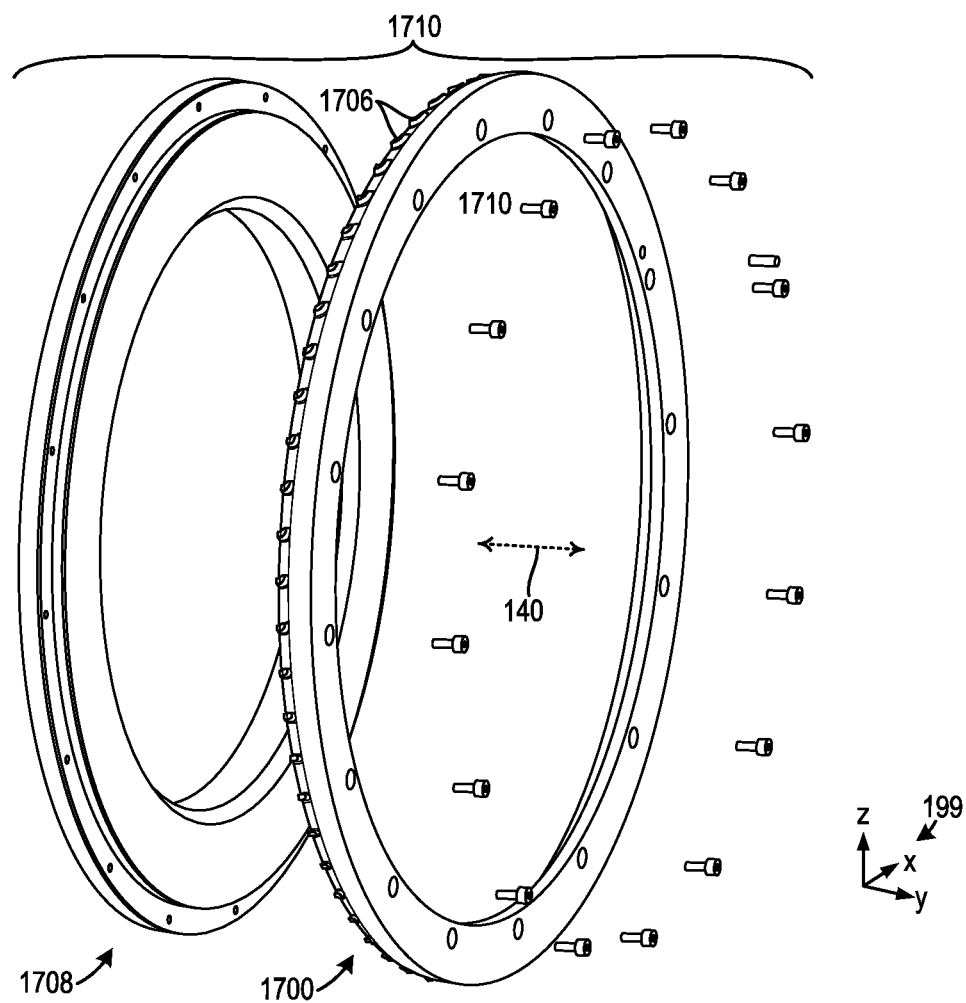
FIG. 19 shows an exploded view of the balancing plate assembly, depicted in FIG. 17.
Figure 20:
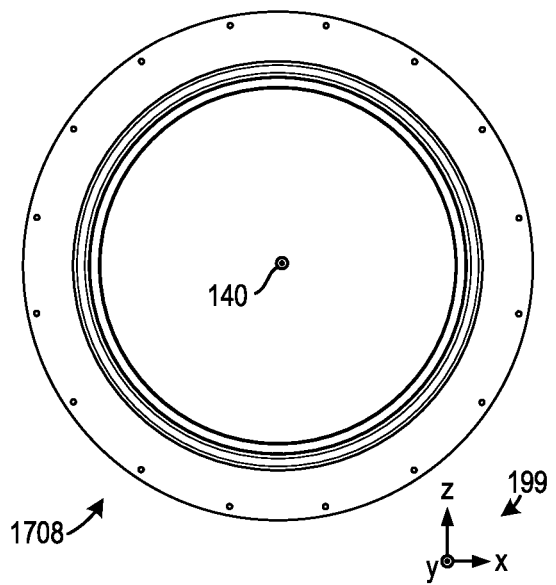
FIG. 20 shows an elevation view of a base plate included in the balancing plate assembly, depicted in FIG. 17.
Figure 21:
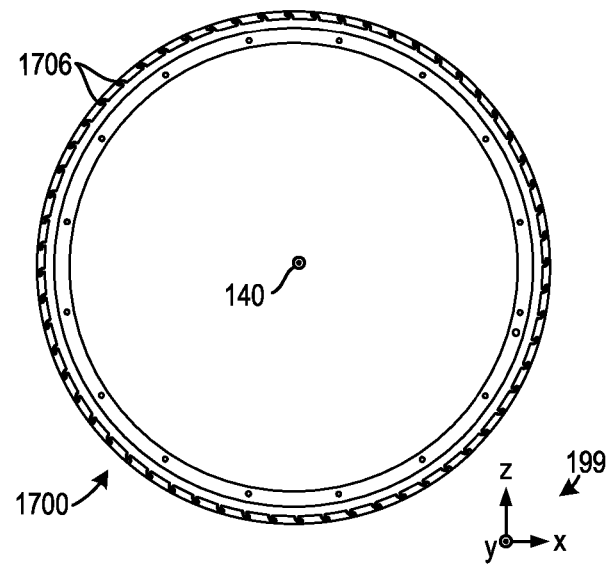
FIG. 21 shows an elevation view of an outer plate included in the balancing plate assembly, depicted in FIG. 17.

FIG. 19 shows an exploded view of the balancing plate assembly 1710 where the ridges 1706 in the outer plate 1700 are again shown. FIGS. 20-21 depict detailed elevation views of the base plate 1708 and the outer plate 1700. The ridges 1706 in the outer plate 1700 are again illustrated.

FIG. 22 shows an assembled view of the balancing plate assembly 1710, FIG. 23 shows a cross-sectional view of the balancing plate assembly 1710, and FIG. 24 shows an even more detailed view of the balancing plate assembly 1710. The ridges 1706 in the outer plate 1700 are shown in FIGS. 22-24. Cutting plane 23-23, shown in FIG. 22 indicates the cross-sectional view shown in FIG. 23. The ridges 1706 circumferentially extend around an outer periphery of the outer plate and may be symmetrically spaced around the plate to achieve rotational mass balance. However, non-symmetric ridge layouts may be used, in other examples. Further, the ridges 1706 are shown axially extending across the outer plates but may also have curvature in a lateral direction. The ridges 1706 may be profiled to generate a pumping effect to reduce the chance of (e.g., prevent) high pressure build-up. Further, the ridges may specifically be curved backwards to create a lower pumping effect and rotor work, consequently. In other words, the concavity of the ridges may extend into a direction that is opposite the direction plate rotation. In this way, the ridges pump effect may be tuned based on desired balancing plate characteristics and more generally machine design goals. Due to the close proximity between the sealing lip and the air gap, oil within in the air gap is pumped out of the air gap by creating a lower pressure at or near the air gap's outlet. Moreover, the flow pattern over the ridges will disturb the inflow of oil from the end space towards the air gap, thereby reducing oil ingress into the air gap from the space around the end windings.

FIG. 25 shows another example of a balancing plate assembly 2500 again including a base plate 2502 and an outer plate 2504, with an attachment device 2506 coupling the two plates together. The outer plate 2504 again includes a lip 2508 with a first curved surface 2510 that has a ridge 2512. However, in the example depicted in FIG. 25, the lip 2508 further includes a second curved surface 2514 positioned on an opposite axial side of the plate as the first curved surface 2510. The second curved surface 2514 further decreases the amount of oil that flows into the air gap.

In other words, the second curved surface boosts the air gap sealing effect achieved by the outer plate.

Figure 26:
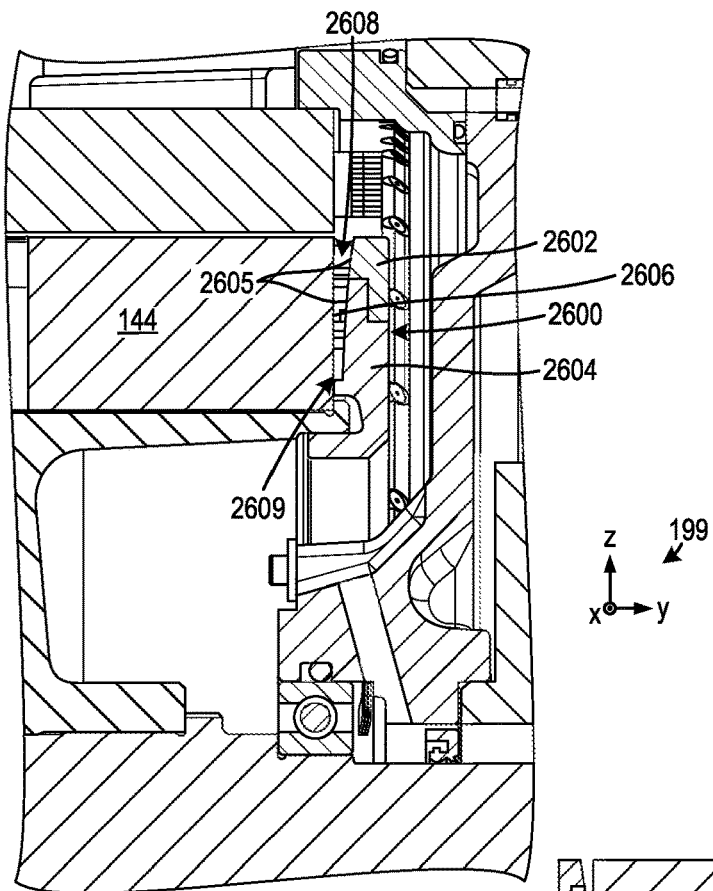
FIG. 26 shows a detailed cross-sectional view of a rotor assembly and a balancing plate assembly according to another example.
Figure 27:
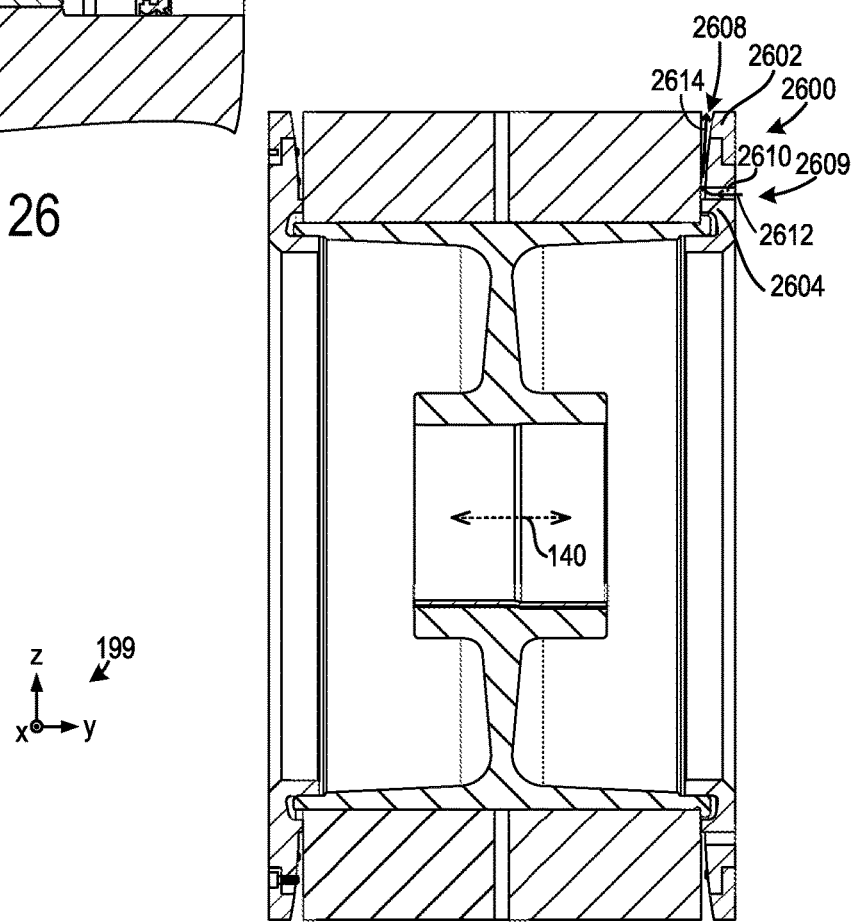
FIG. 27 shows a cross-sectional view of the rotor assembly and the balancing plate assembly, depicted in FIG. 26.

FIGS. 26-27 show a cross-sectional view of another example of a balancing plate assembly 2600. In the balancing plate assembly 2600 depicted in FIGS. 26-27, the outer plate 2602 and the base plate 2604 include inner surfaces 2605 that, along with a side surface 2606 of the rotor stack 144, form a planar channel 2608 (e.g., an air curtain channel) in an air passage arrangement 2609. To create fluid flow through the planar channel 2608, the base plate 2604 may, in some examples, be formed with an axial channel 2610 (also included in the air passage arrangement 2609) that extends through the plate (from an outboard axial side to an inboard axial side), as specifically illustrated in FIG. 27. Arrow 2612 depicts the general direction of fluid flow through the axial channel 2610, and arrow 2614 depicts the general direction of fluid flow through the planar channel 2608. Thus, the fluid from the planar channel 2608 may direct flow towards the end windings and create a lower pressure around the air gap outlet to again effectuate pumping action of fluids through the air gap. To elaborate, the air curtain channel may include multiple axial inlet channels in the base plate followed by backwards curved radial channels through both the base plate and the outer plate. The radial channels create a pumping effect, therefore drawing in air from the end space through the inlet channels. The air flows along the radial channels and seals the air gap by creating an air curtain across the air gap. The channels in the outer plate may be slightly axially bent outwards so as to give the air flow a direction towards the end windings for additional cooling. It will be appreciated that the air passage arrangement 2609 shown in FIG. 26-27 may be combined with any of the previously described balancing plate assemblies that include straight, curved, or bladed outer plates to form other system variants.

Figure 28:
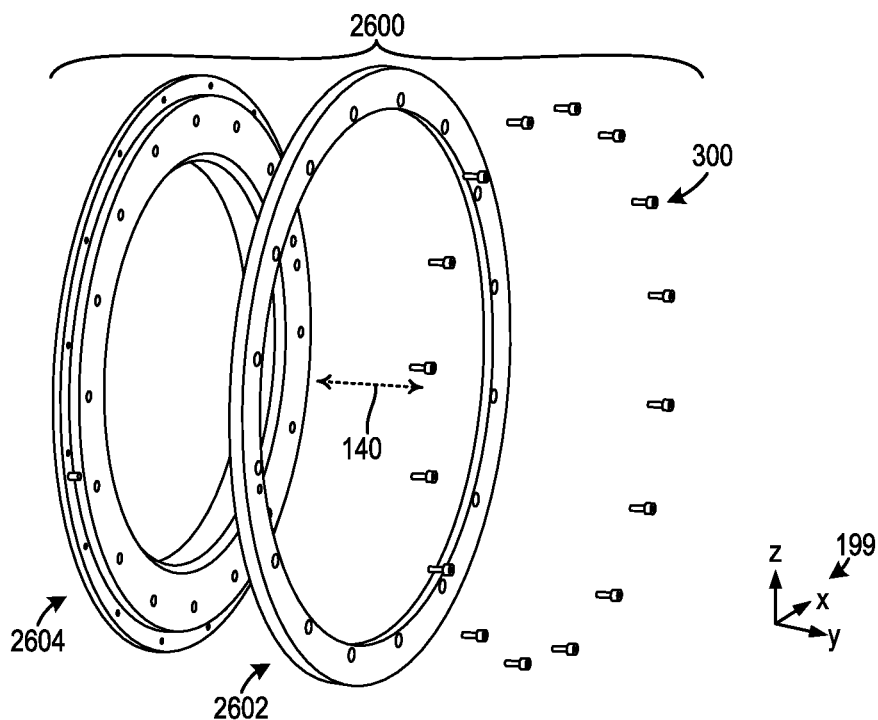
FIG. 28 shows an exploded view of the balancing plate assembly, depicted in FIG. 27.
Figure 29:
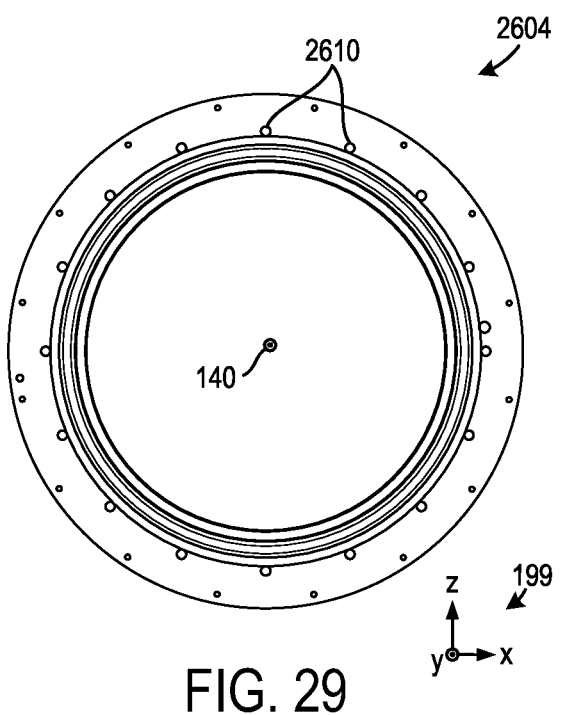
FIG. 29 shows an elevation view of a base plate included in the balancing plate assembly depicted in FIG. 27.
Figure 30:
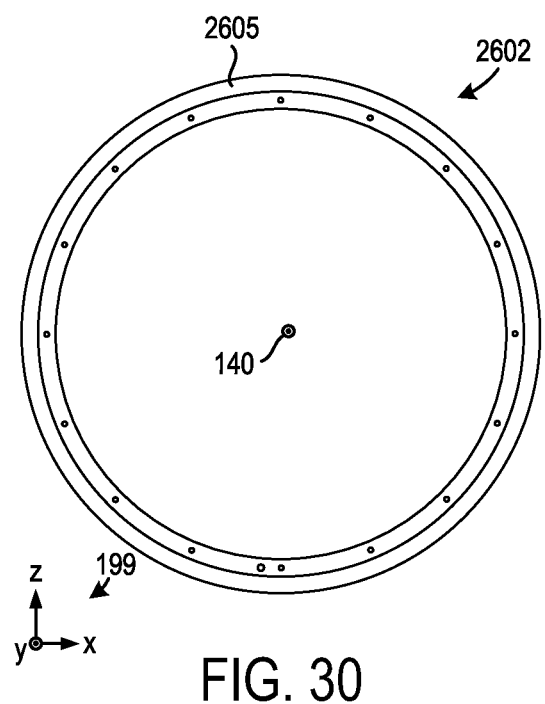
FIG. 30 shows an elevation view of an outer plate included in the balancing plate assembly, depicted in FIG. 27.

FIG. 28 shows an exploded view of the base plate assembly 2600 with attachment devices 300 designed to attach the plates 2602 and 2604 to one another. FIGS. 29-30 show the base plate 2604 with the axial channels 2610 and the outer plate 2602 with the inner surface 2605.

Figure 31:
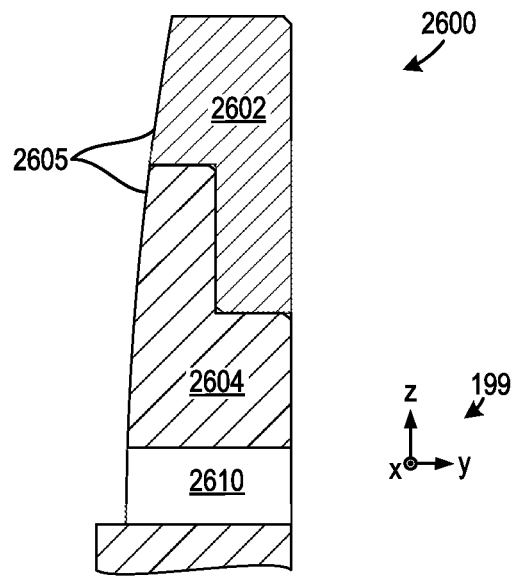
FIGS. 31-33 shows different assembled views of the balancing plate assembly depicted in FIG. 27.
Figure 32:
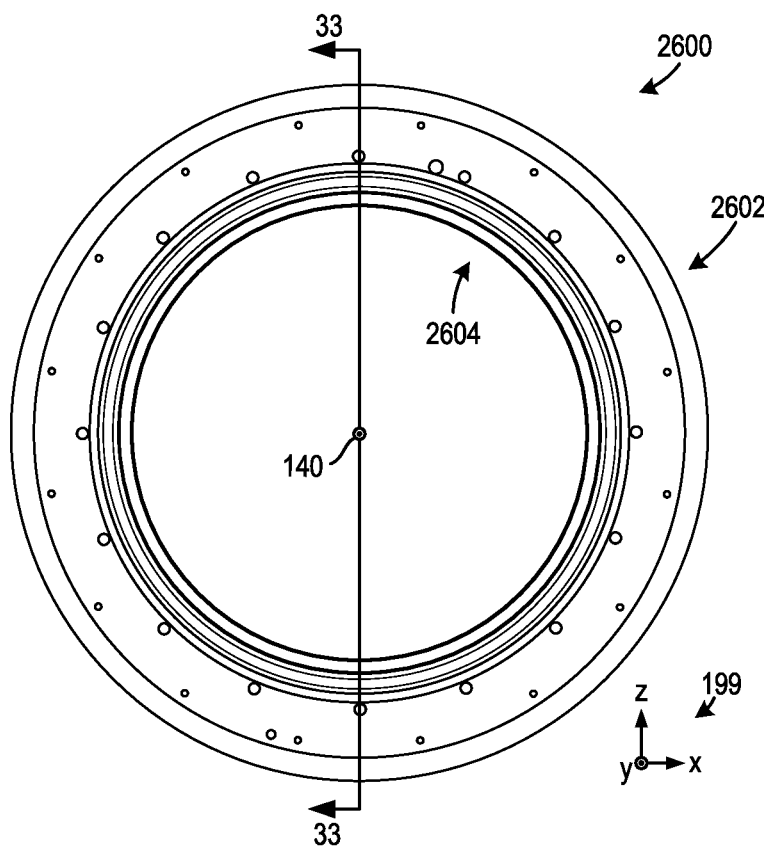
Figure 33:
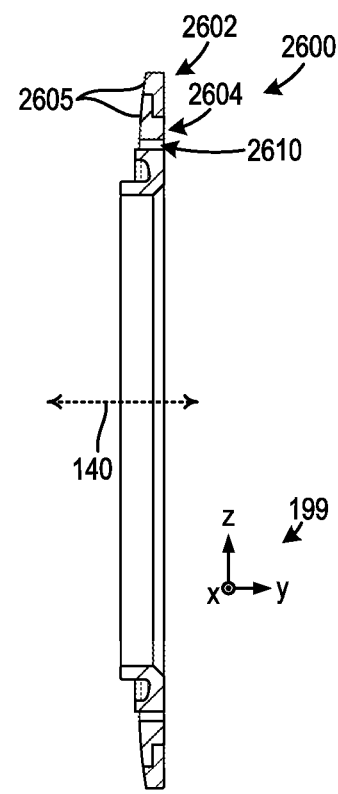

FIGS. 31-33 shows different assembled views of the balancing plate assembly 2600. Cutting plane 33-33, depicted in FIG. 32, defines the cross-sectional view shown in FIG. 33. The inner surfaces 2605 of the outer plate 2602 and the base plate 2604 are again illustrated. Turning specifically to FIG. 33, one of the axial channels 2610 is depicted.

Figure 34:
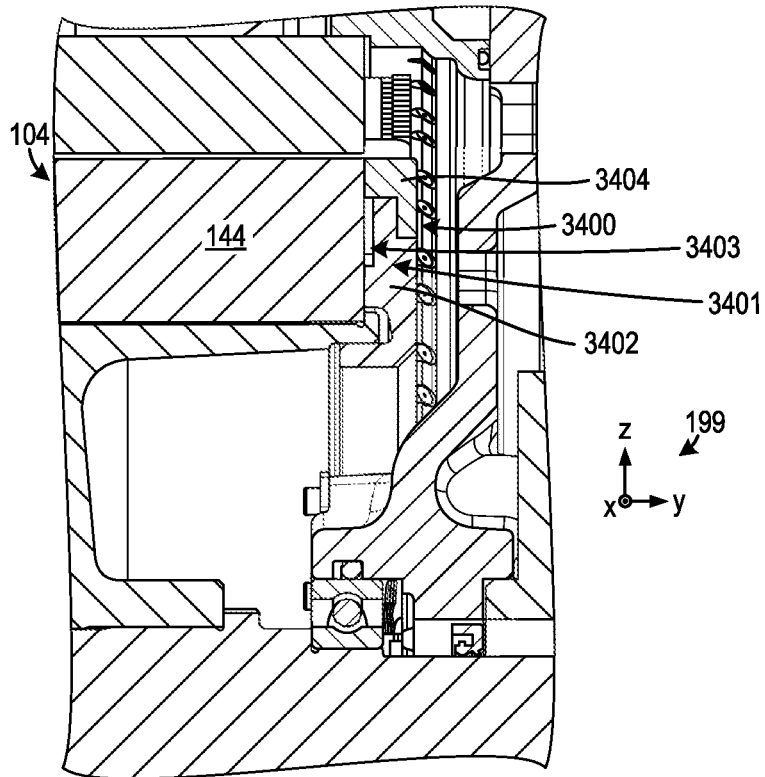
FIG. 34 shows a detailed cross-sectional view of a rotor assembly and a balancing plate assembly according to yet another example.
Figure 35:
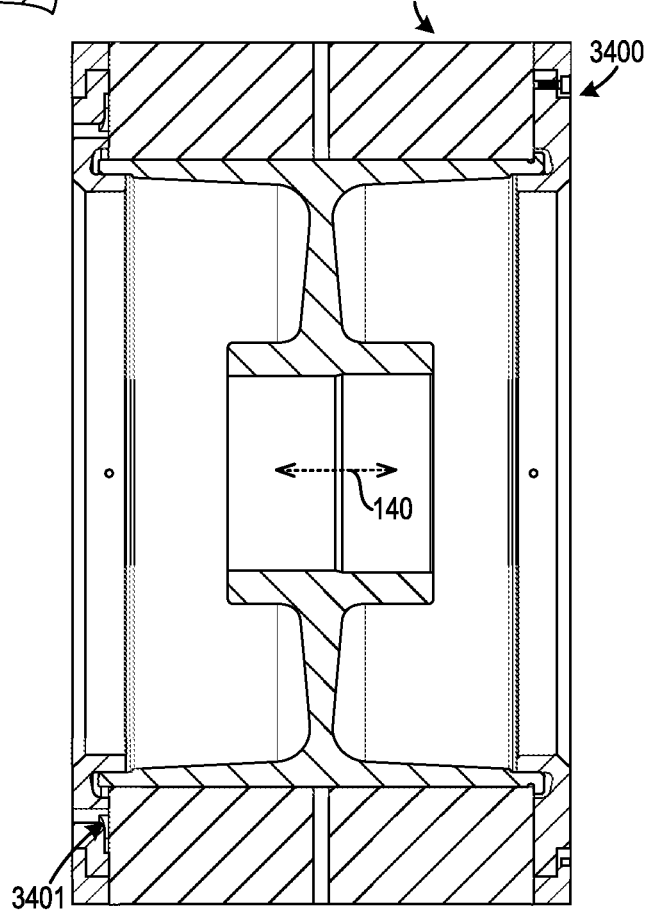
FIG. 35 shows a cross-sectional view of the rotor assembly and the balancing plate assembly, depicted in FIG. 34.

FIGS. 34 and 35 show another example of a balancing plate assembly 3400 coupled to the rotor assembly 104 (e.g., the rotor stack 144). An air passage arrangement 3401 with a planar channel 3403 is further shown in FIGS. 34 and 35.

Figure 36:
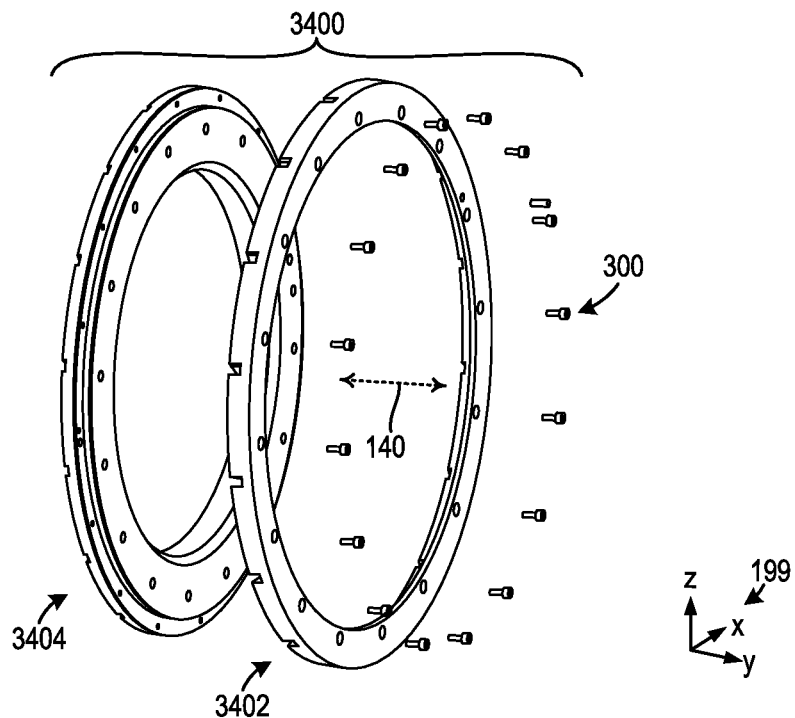
FIG. 36 shows an exploded view of the balancing plate assembly, depicted in FIG. 34.
Figures 37, 38:
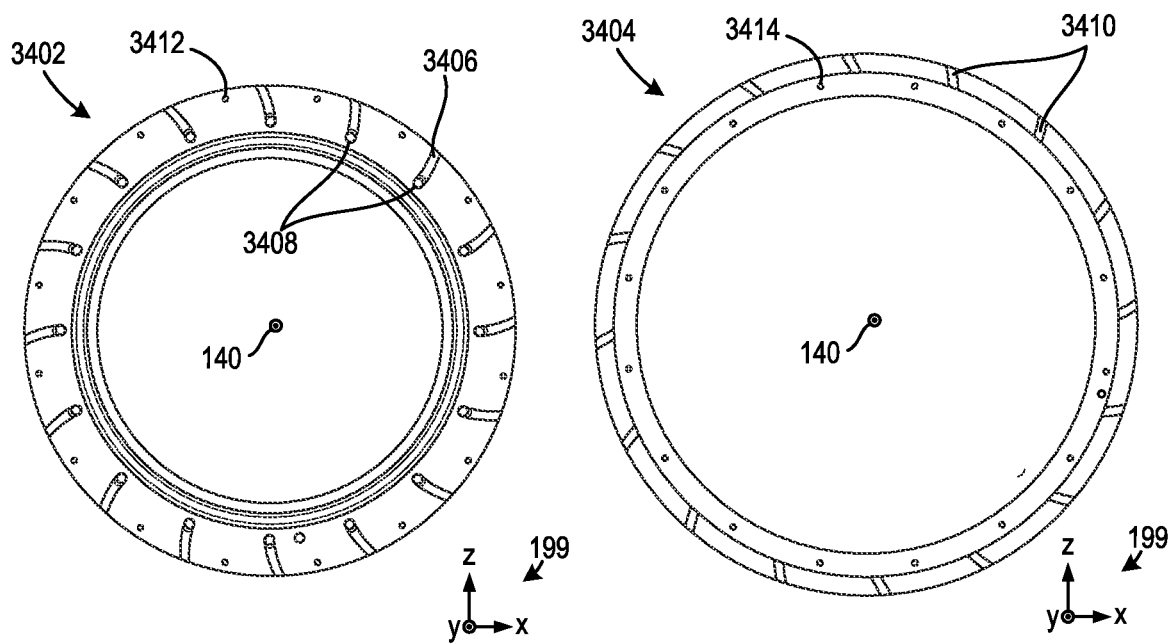
FIG. 37 shows an elevation view of a base plate included in the balancing plate assembly, depicted in FIG. 34.
FIG. 38 shows an elevation view of an outer plate included in the balancing plate assembly, depicted in FIG. 34.

FIG. 36 shows an exploded view of the balancing plate assembly 3400 and FIGS. 37 and 38 show detailed view of a base plate 3402 and the outer plate 3404, respectively. The base plate 3402 is shown including recesses 3406 that are in fluidic communication with axial channels 3408. The outer plate 3404 further includes recesses 3410 (also included in the air passage arrangement 3401) that are in fluidic communication with the recesses 3406 in the base plate 3402, when assembled. The base plate 3402 again may include threaded bores 3412 and the outer plate 3404 may include attachment device openings 3414.

Figure 39:
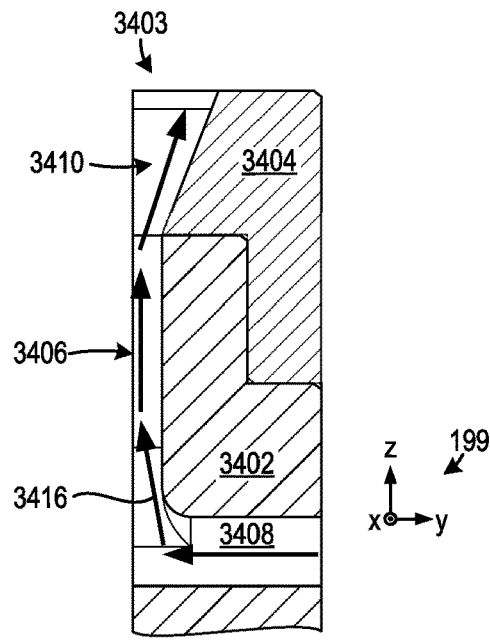
FIGS. 39-41 show different assembled views of the balancing plate assembly, depicted in FIG. 34.
Figures 40, 41:
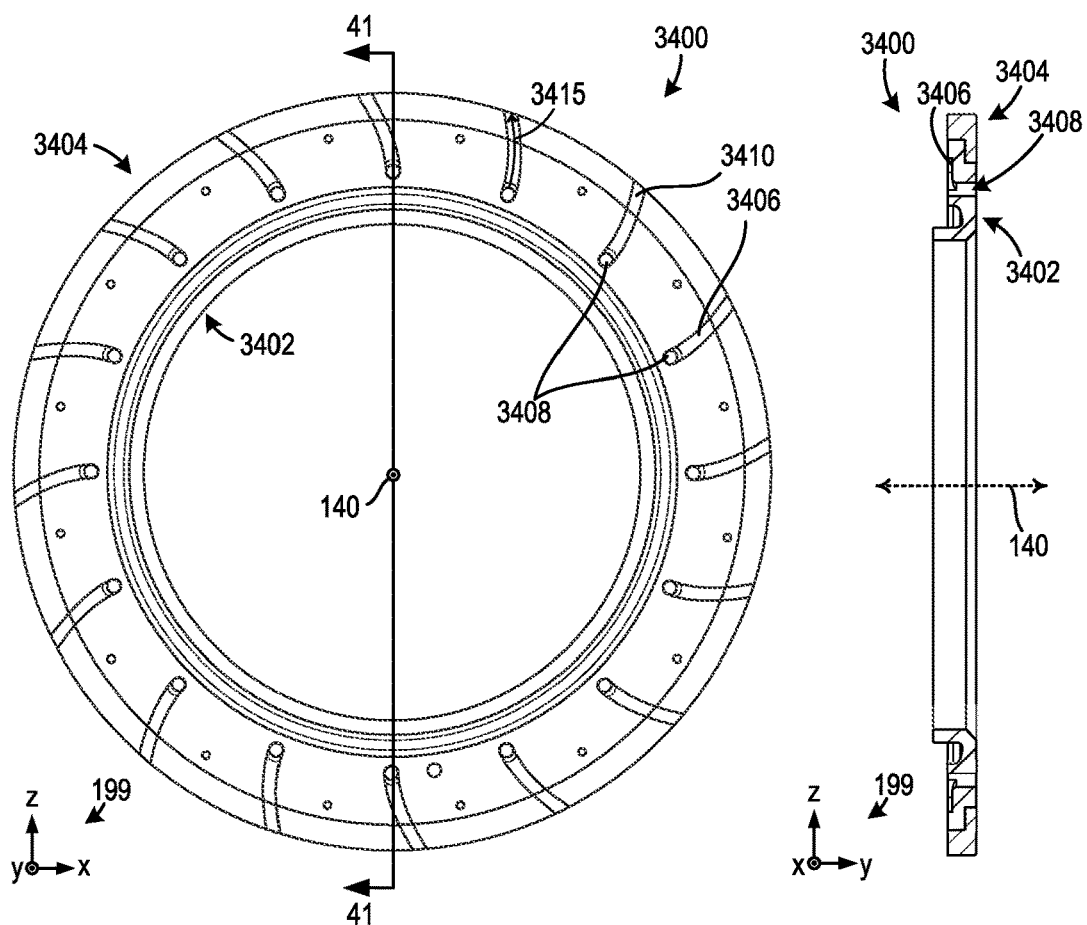

FIGS. 39-41 show different assembled views of the balancing plate assembly 3400. The axial channels 3408, recesses 3406, and recesses 3410 are illustrated. Cutting plane 41-41, shown in FIG. 40, indicates the cross-sectional view shown in FIG. 40. Specifically, as shown in FIG. 40 the recesses 3406 and 3410 may curve and arrows 3415 indicate the general direction of fluid through these curved recesses. Arrows 3416, shown in FIG. 39, represent the generally direction of fluid flow through air passage arrangement 2609 in the base plate assembly 3400. As shown, fluid flows through the axial channel 3408 and then through the recesses 3406 and 3410. Further, the recesses 3410 in the outer plate 3404 may taper in a radially inward direction. In this way, fluid expelled from the recess may be directed toward the end windings to increase cooling of the windings.

FIG. 42 shows a rotor assembly 4200 with an air passage arrangement 4202. The rotor assembly 4200 may be included in an electric machine similar to the electric machine 100, and may thus share similarities with the rotor assembly 104, shown in FIGS. 1-2. Therefore, similar components such as the air gap 156, etc. are similarly numbered. The air passage arrangement 4202 includes one or more axial air passages 4204 that extend through the rotor stack 4203 and one or more corresponding radial air passages 4206 that open into the air gap 156. The axial air passages 4204 include inlets 4208 that are in fluidic communication with axial channels 4210 that extend through a base plate 4212 of a balancing plate assembly 4214 coupled to the rotor stack 4203. FIG. 43 specifically, shows the radial air passages 4206 positioned near a midpoint 4205 of the rotor stack 4203. Thus, air may flow axially outwards through the air gap 156 toward the opposing ends of the rotor stack 4203. In this way, the radial air passages 4206 may function as a breather, allowing air to flow into the middle of the air gap and then outwards toward the end windings.

FIG. 44 shows the flow pattern of the air through the air passage arrangement 4202, indicated via arrows 4216. As previously indicated, air flows through the axial channels 4210 in the base plate 4212 into the axial air passages 4204 in the rotor stack 4203, from the axial passages into the radial air passages 4206, and from the radial passages into the air gap 156. In the air gap 156 air flows in opposing axial directions, thereby expelling oil from the air gap. To elaborate, in the flow pattern depicted in FIG. 44, air is drawn in through the axial channels 4210 of the base plate and then through axial air passages 4204 in the rotor stack. In the middle of the rotor stack, the plate 4218 with cutouts 4224, shown in FIG. 45, that form the radial air passages 4206 depicted in FIG. 44, compress the air and forces the air to flow radially outwards. Next, the air bends into the air gap 156 where it is forced to flow axially towards the axially opposing end spaces of the machine. Trapped oil in the air gap is blown out of the air gap due to the momentum of the air flow. Furthermore, the chance of oil flow from the end space into the air gap is reduced by creating the air counterflow. It will be appreciated that the air passage arrangement 4202 shown in FIG. 44 may be combined with any of the previously described balancing plate assemblies that include straight, curved, or bladed outer plates to form other system variants.

Figure 45:
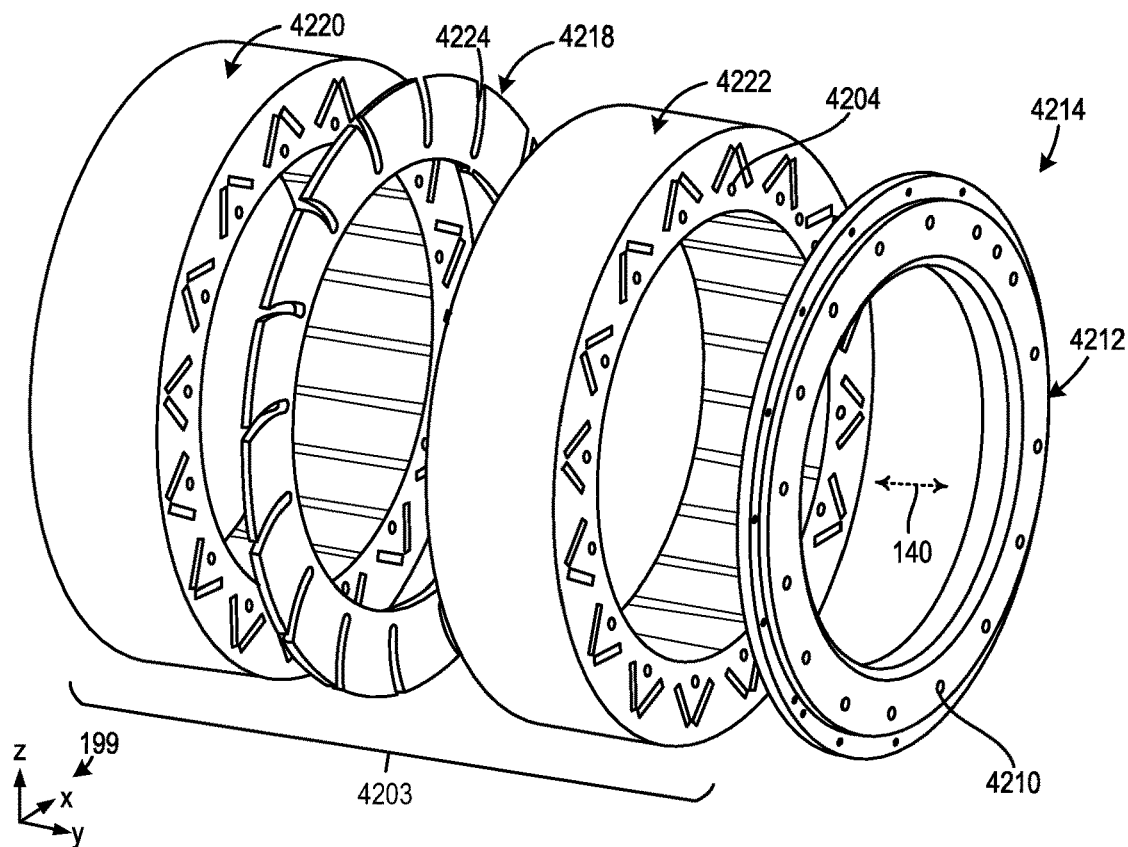
FIG. 45 shows an exploded view of the rotor assembly and balancing plate assembly, depicted in FIG. 42.

FIG. 45 shows and exploded view of the rotor stack 4203 and the base plate 4212 in the balancing plate assembly 4214. The axial channels 4210 in the base plate are again shown. Further, the rotor stack 4203 is shown including a plate 4218 that is positioned axially between two sections 4220 and 4222 of the stack. The sections 4220, 4222 include the axial air passages 4204, and the plate 4218 includes cutouts 4224 that radially extend outward through the plate 4218. In this way, the radial air passages of the air passage arrangement are formed in the rotor stack. However, in other examples, the radial air passages may be formed within in the rotor lamination stack.

Figure 46:
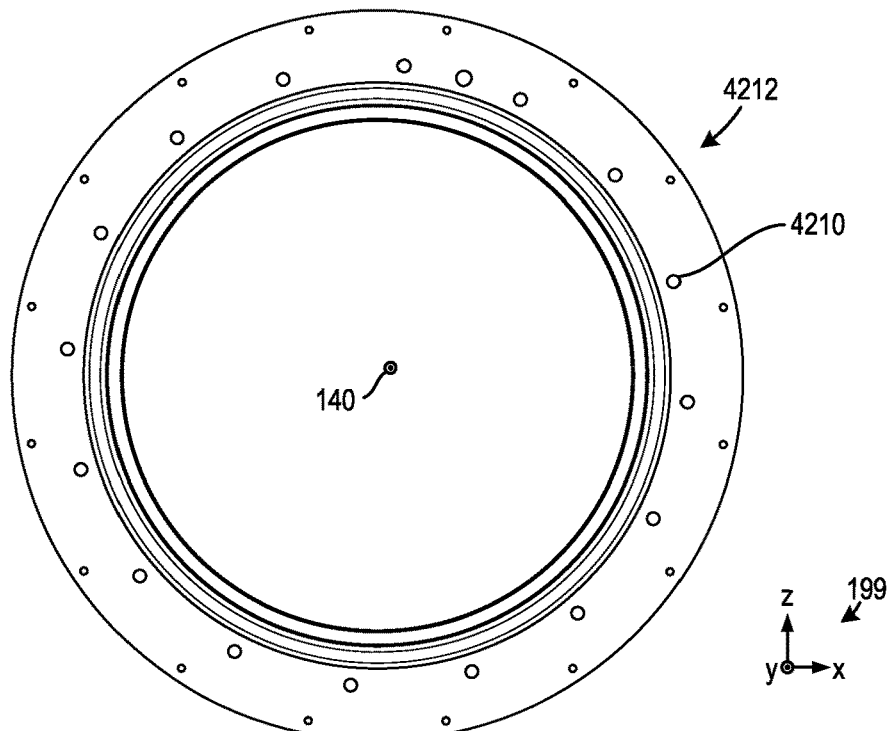
FIG. 46 shows an elevation view of a base plate included in the balancing plate assembly, depicted in FIG. 42.
Figure 47:
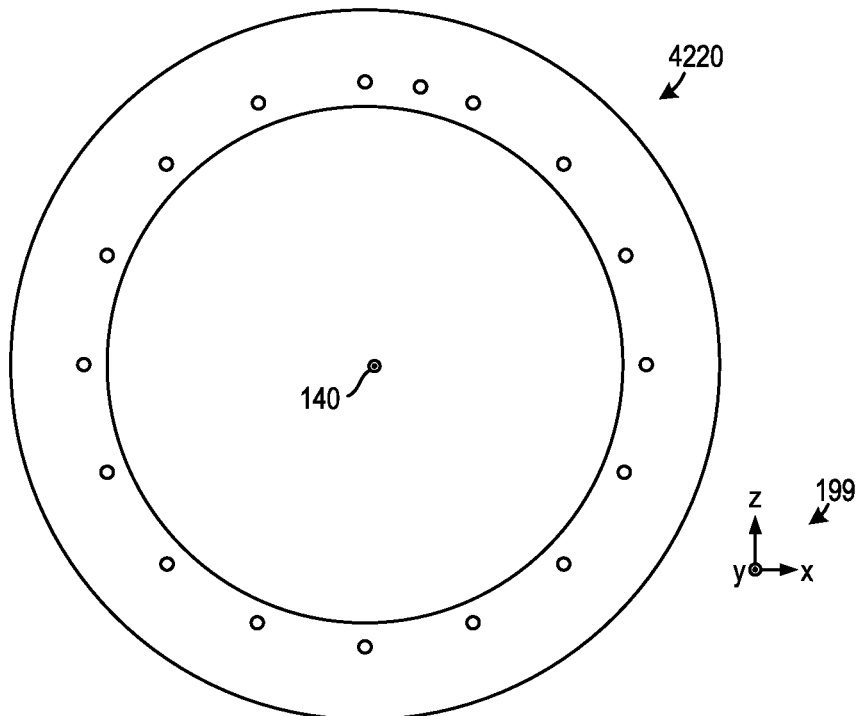
FIG. 47 shows an elevation view of a section of the rotor assembly, depicted in FIG. 42, particularly illustrating axial air passages formed therein.
Figure 48:
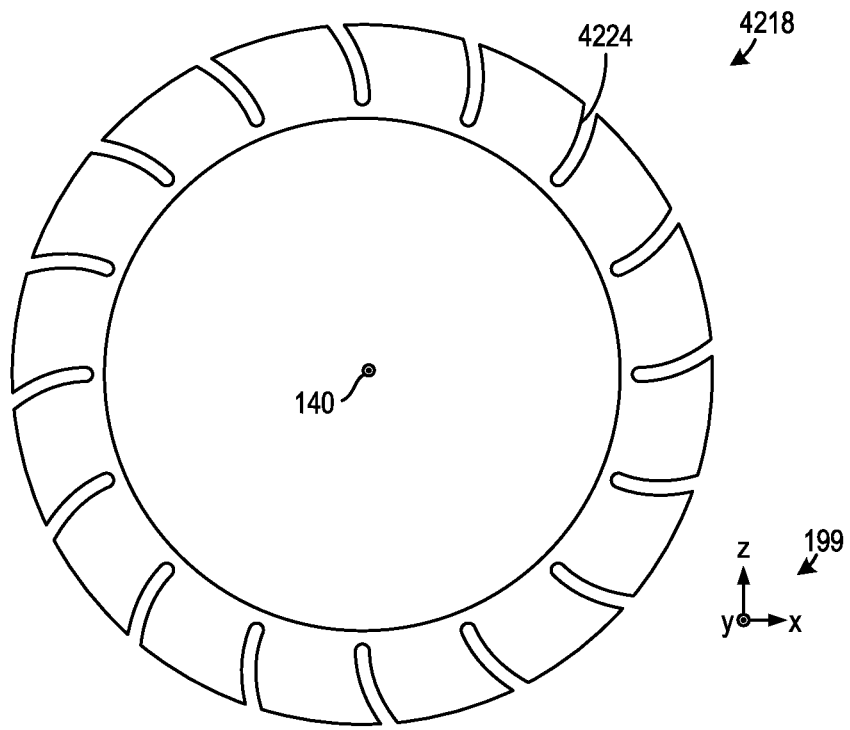
FIG. 48 shows an elevation view of a plate positioned between sections of the rotor assembly, depicted in FIG. 42, particularly illustrating cutouts of the plate which form portions of the air passage arrangement.

FIG. 46 shows the base plate 4212 with the air channels 4210. FIG. 47 shows one of the laminations 4700 in one of the rotor stack sections 4220, 4222, depicted in FIG. 45. The lamination 4700 includes openings 4702 the form the axial air passages 4204, shown in FIG. 45. FIG. 48 shows the plate 4218 with cutouts 4224.

Figure 49:
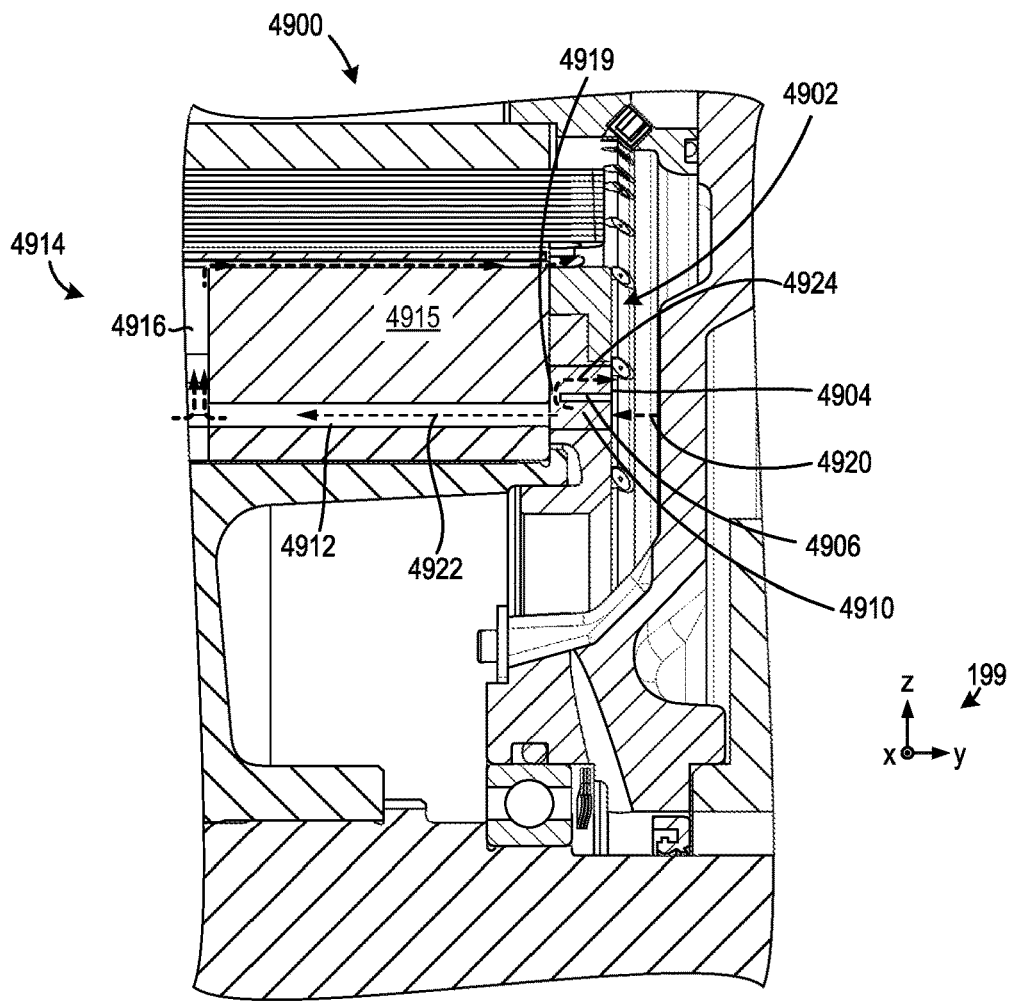
FIG. 49 shows a detailed cross-sectional of a rotor assembly and a balancing plate assembly, according to another example where a base plate of the balancing plate assembly includes an oil separator arrangement.
Figure 50:
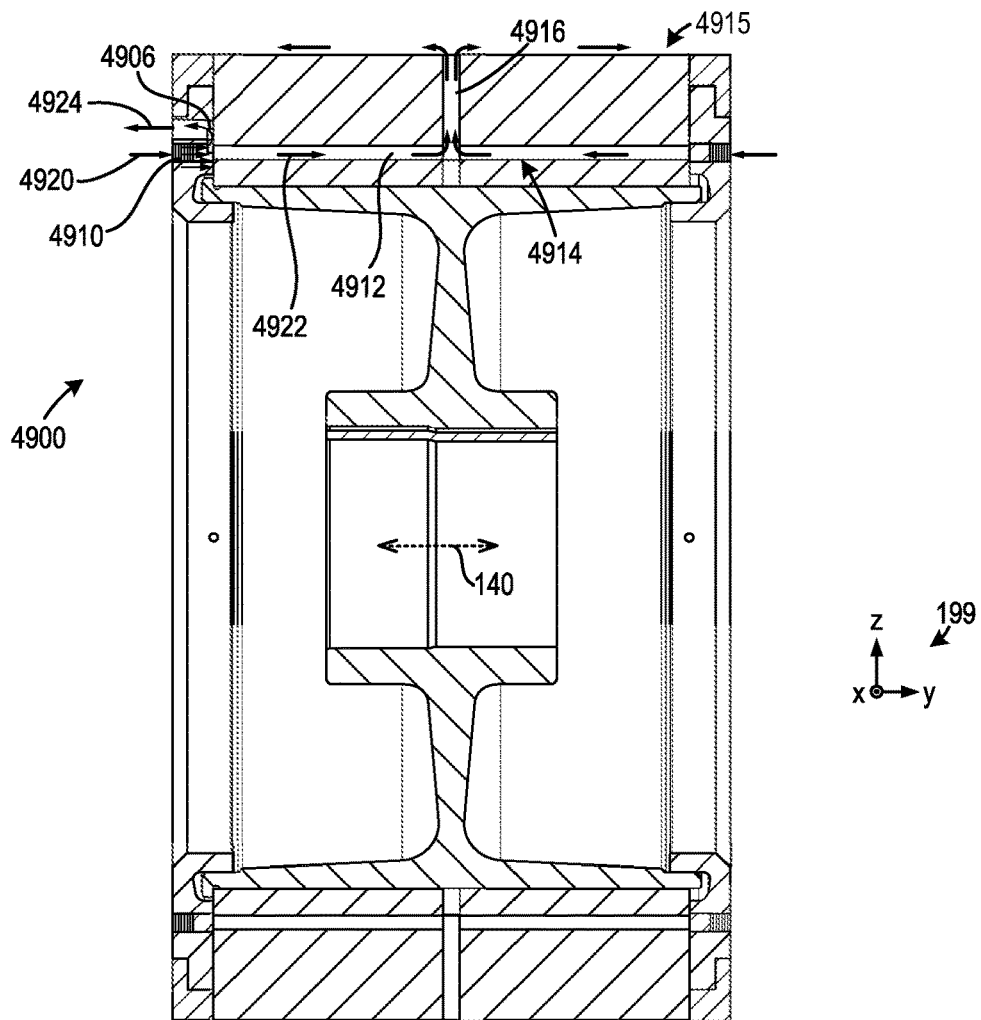
FIG. 50 shows a cross-sectional view of the rotor assembly and balancing plate assembly, depicted in FIG. 49.
Figure 51:
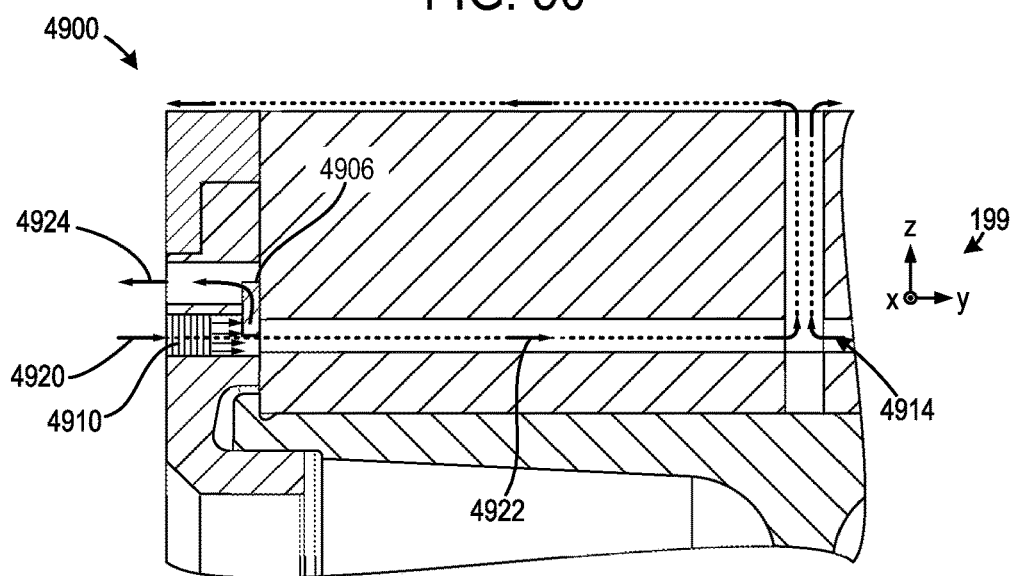
FIG. 51 shows a detailed cross-sectional view of the rotor assembly and balancing plate assembly depicted in FIG. 49, particularly illustrating a flow path formed therein.

FIGS. 49-51 show a rotor assembly 4900 and a balancing plate assembly 4902 with channels in the base plate 4904 that include an oil separator 4906. The oil separator 4906 may axially traverse the air channels 4910 (in the base plate 4904), as particularly shown in FIG. 51, that open into axial air passages 4912 in an air passage arrangement 4914 in rotor stack 4915 of the rotor assembly 4900. The air passage arrangement again includes radial air passages 4916. To elaborate, to reduce the chance of oil from being pumped by the rotor disk which would cause oil to flow into the air gap and a higher pressure build-up, the oil separator 4906 may be embedded in the base plate 4904. Due to centrifugal forces and the large density difference between oil and air, the oil-air mixture will separate in one or more of the air channels 4910 (e.g., inlet channels) and an oil film will be formed at the outside (e.g., highest radius) of said channel. A radial channel 4919 in the base plate pumps the separated oil back to the end space where it can be used for cooling and/or lubrication purposes, e.g., directed towards end windings, bearings, gearbox, etc. As such, FIGS. 49-51 depict an air and oil flow path (indicated via arrows 4920), an air flow path (indicated via arrows 4922), and an oil flow path (indicated via arrows 4924) through the base plate 4904 and the air passage arrangement 4914. It will be appreciated that the oil separator may be combined with any of the previously described balancing plate assemblies that include straight, curved, or bladed outer plates to form other system variants.

Figure 52:
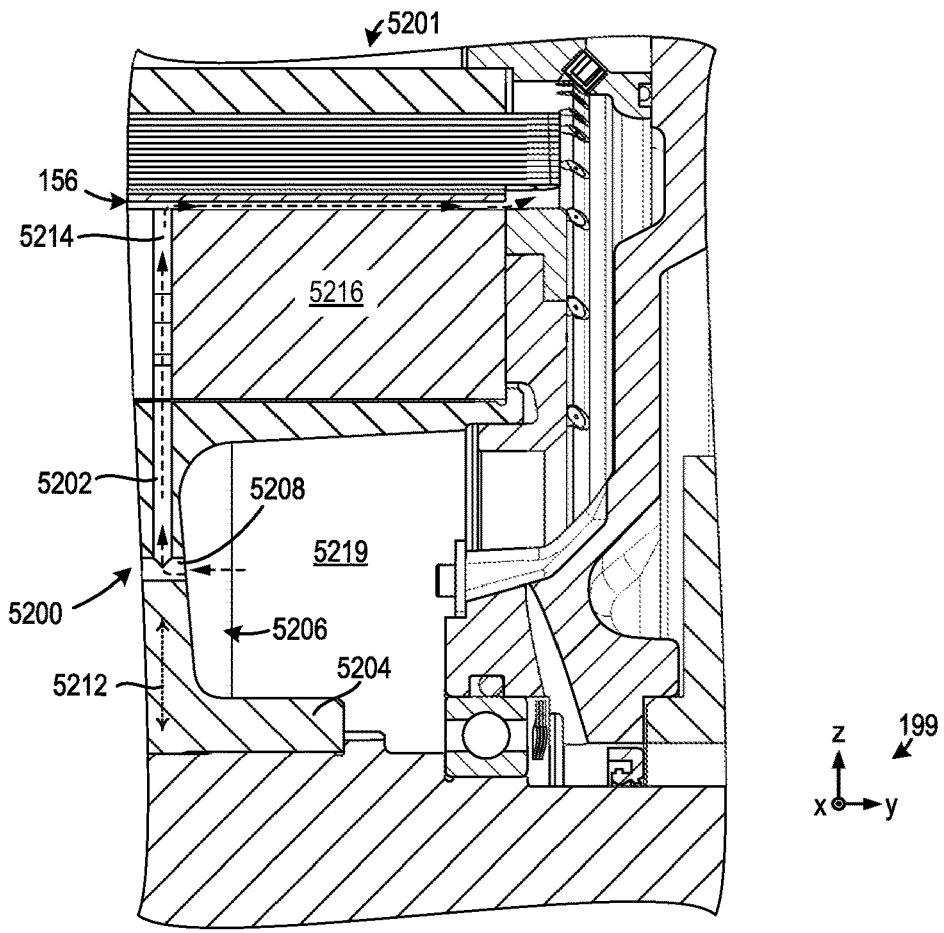
FIG. 52 shows a detailed cross-sectional view of another an air passage arrangement formed in a rotor assembly and a balancing plate assembly, according to yet another example.
Figure 53:
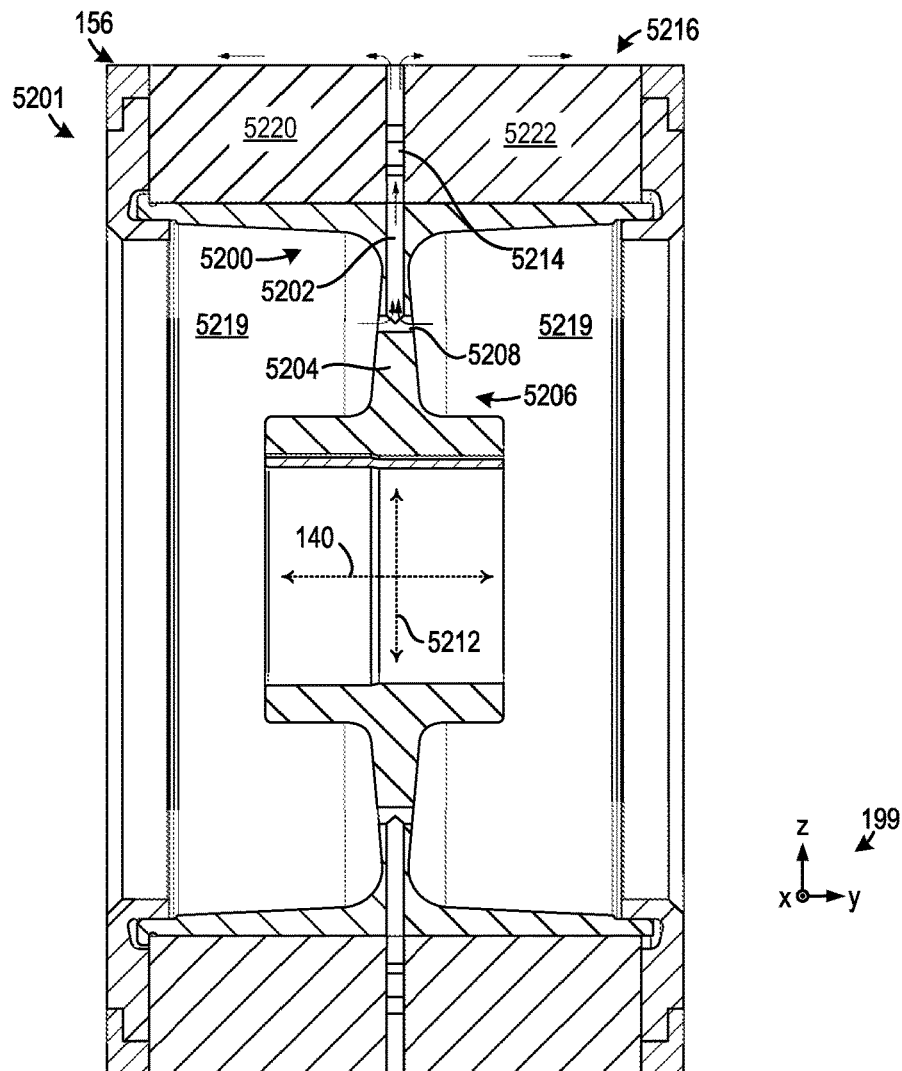
FIG. 53 shows a cross-sectional view of the rotor assembly and the balancing plate assembly, depicted in FIG. 52.
Figure 54:
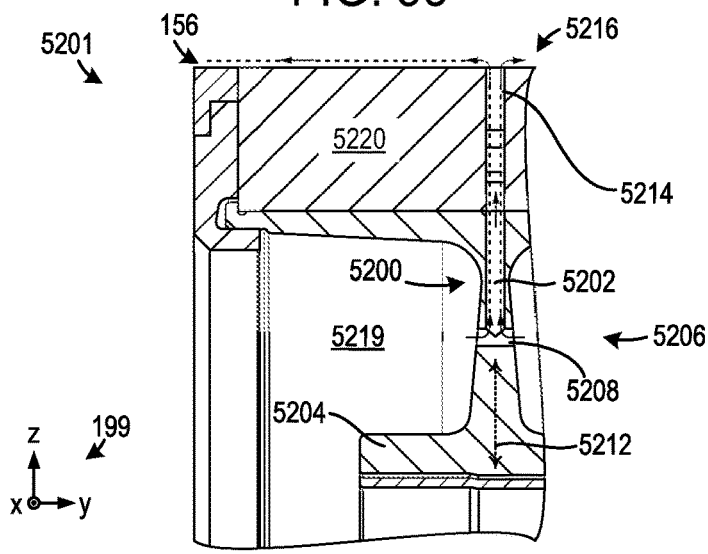
FIG. 54 shows a detailed cross-sectional view of the rotor assembly and balancing plate assembly depicted in FIG. 52, particularly illustrating a flow path formed therein.

FIGS. 52-54 show another air passage arrangement 5200. The air passage arrangement 5200 includes an air passage 5202 that extends through a radial rotor section 5204 in the rotor hub 5206 of a rotor assembly 5201. The air passage 5202 includes inlets 5208 that open into cavities 5219. In this way, air with a comparatively low oil fraction may be drawn into the air passage arrangement 5200. Due to the low oil fraction, an oil separator may be omitted from the air passage arrangement 5200, if desired. Further, the air passage arrangement 5202 may be combined with any of the previously described balancing plate assemblies that include straight, curved, or bladed outer plates, the air passage arrangement 4202, shown in FIG. 42, and/or the air passage arrangement 4914, shown in FIGS. 49-51, to form other system variants.

The radial rotor section 5204 may be adjacent to an axial midline 5212 of the rotor assembly 5201. In this way, air may be directed through a center of the rotor assembly 5201. The air passage 5202 is in fluidic communication with the radial air passages 5214 that extend through a rotor stack 5216 of the rotor assembly 5201 and open into the air gap 156.

Figure 55:
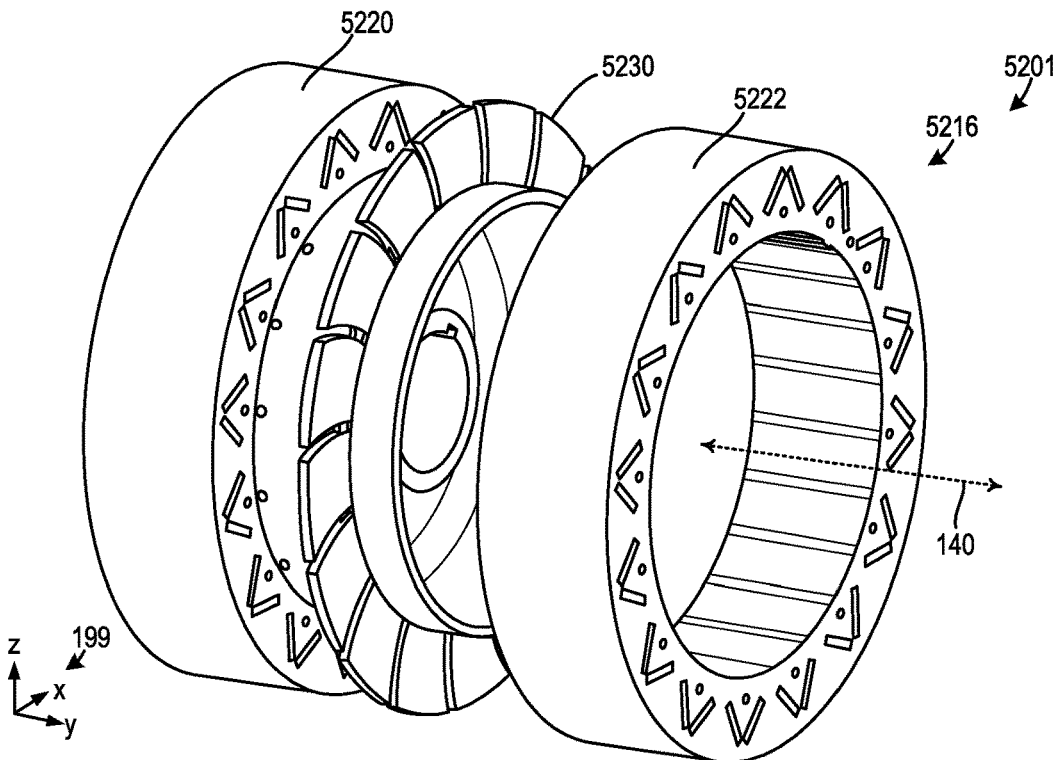
FIG. 55 shows an exploded view of the rotor assembly, depicted in FIG. 52.
Figure 56:
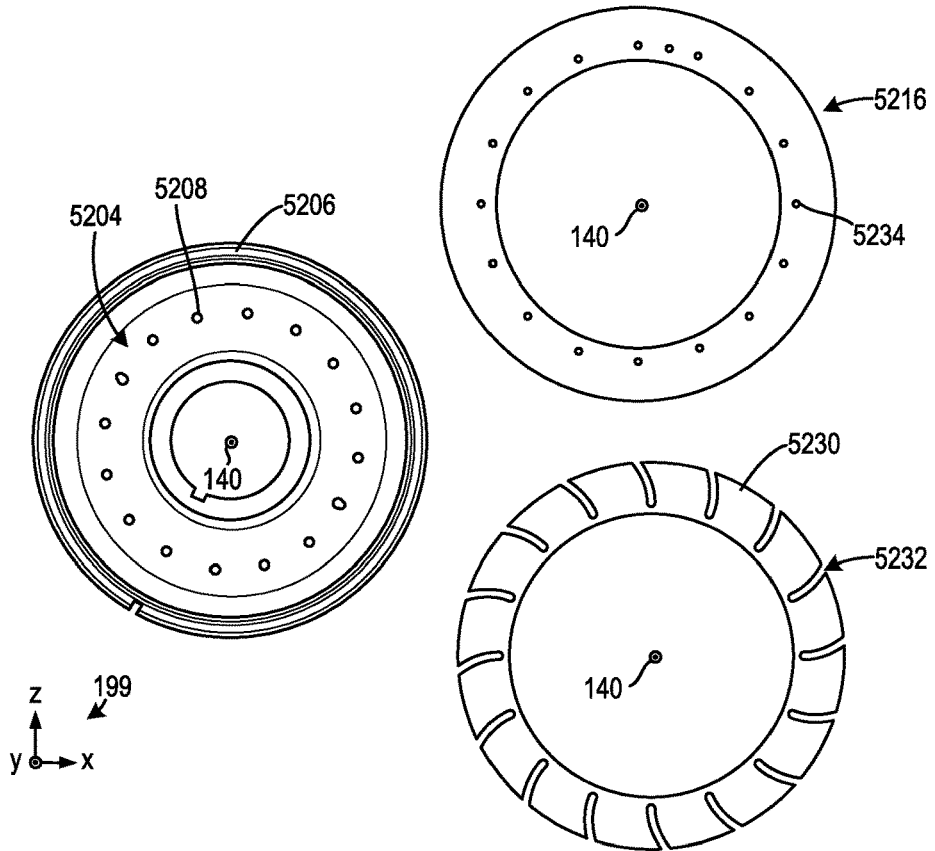
FIG. 56 shows elevation views of different components in the rotor assembly, depicted in FIG. 52.

FIGS. 55 and 56 show different exploded views of the air passage arrangement 5200 and the rotor assembly 5201. The rotor assembly 5201 again includes a plate 5230 positioned between two rotor stack sections 5220, 5222.

FIG. 56 specifically depicts the plate 5230, the rotor hub 5206 including inlets 5208 formed therein, and a section of the rotor stack 5216. The plate 5230 again includes cutouts 5232 that form the radial air passages. Further, the sections of the stack 5216 may also include axial air passages 5234, similar to the previous air passages designs, to provide even greater air flow rates through the air gap.

Figure 57:
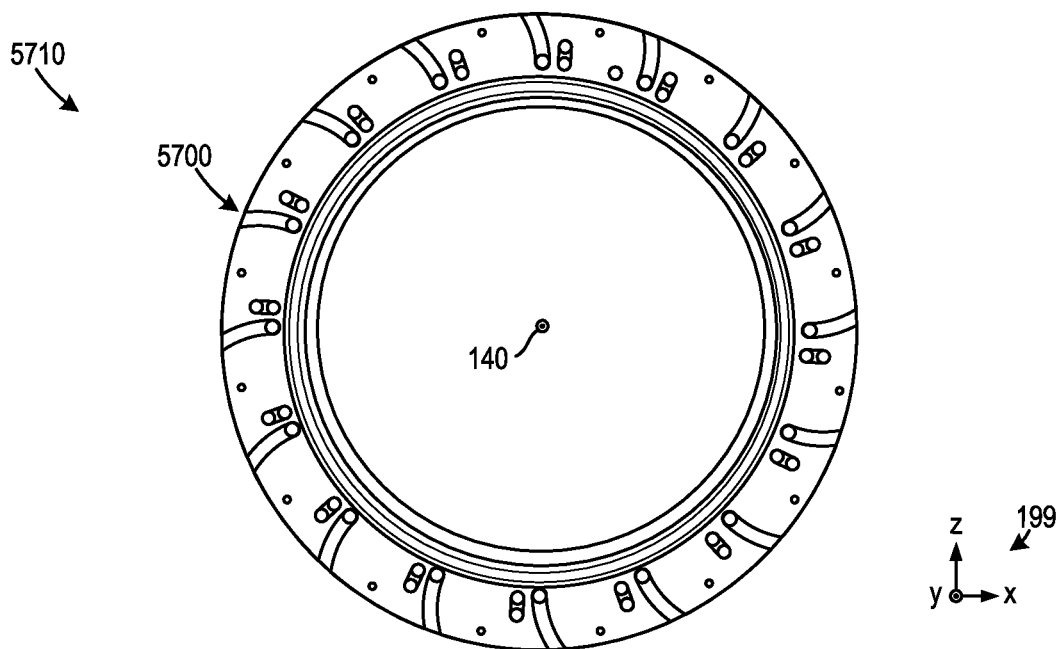

FIG. 57 shows an example base balancing plate 5700 that may be included in an electric machine product line 5710. The plate 5700 shown in FIG. 57 has a combination of the fluid flow features from the different examples of the balancing plate assemblies described herein. In this way, different flow features may be combined to achieve even greater amount of fluid flow near the air gap outlet to reduce the amount of oil in the air gap.

Figure 58:
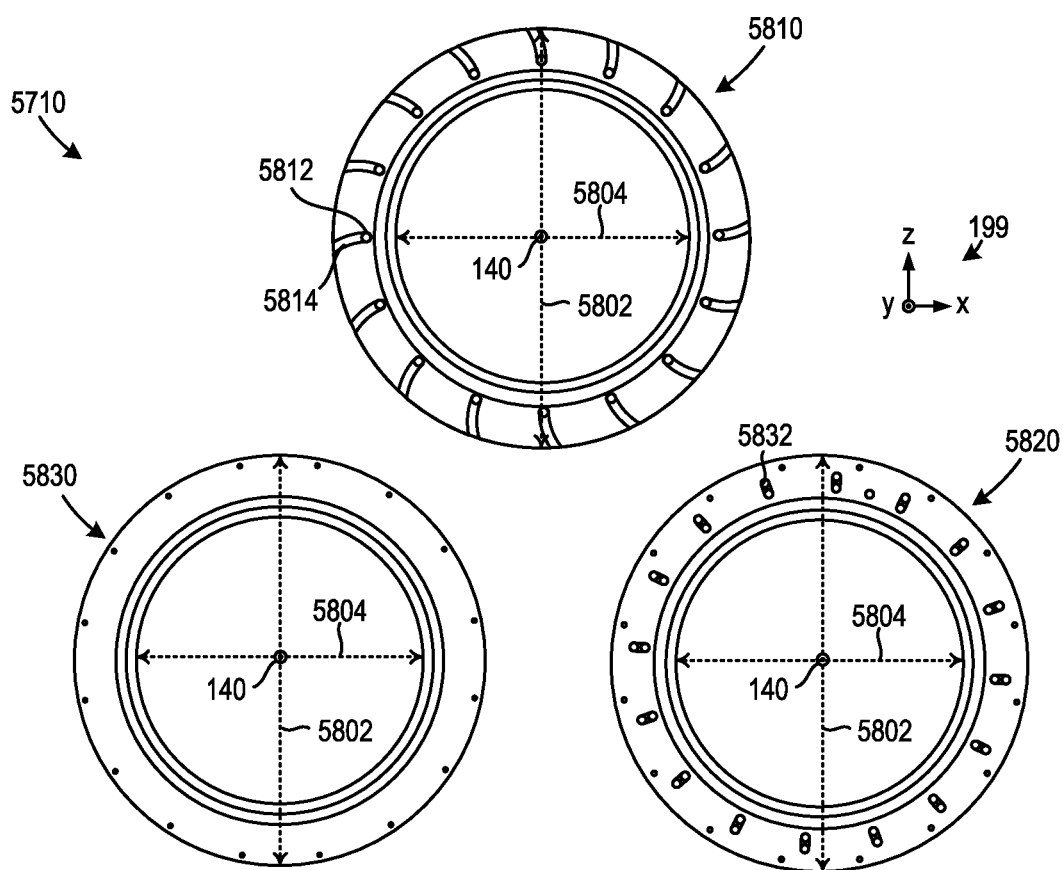

FIG. 58 shows different base balancing plates 5810, 5820, and 5830 that may be included in the electric machine product line 5710. These plates have a similar outer diameter 5802 and inner diameter 5804 but have different arrangements of openings and/or recesses in the plate the direct fluid flow through the balancing plate assembly. Thus, the plates in the product line have a modular design that can be used in a family of products, such as in a product family that includes both low and high speed motors, for instance. In this way, a common plate design can be used in the product line and then adapted for the plate's end-use application such as the motor's performance targets and motor's cooling system configuration. In this way, a larger number of plates may be manufactured in a common product line more cost effectively (taking advantage of economies of scale cost reductions) while at the same time achieving a high level of plate adaptability with regard to the tuning of motor performance characteristics. In this way, production costs of the plates may be reduced while being able to meet different end-user design specifications. For instance, plate 5820 solely has axial channels 5832 while the plate 5810 has axial channels 5812 and recesses 5814. Further, each of the plates 5810, 5820, and 5830 may include threaded bores for attaching the base plate to an outer plate and/or for attaching nozzles and stops. To reduce manufacturing costs of the plate, each of the base plates in the product line may be constructed out of a similar non-magnetic material such as aluminum.

FIG. 59 shows yet another base balancing plate 5900 that may include additional axial channels for directing fluid therethrough. This base balancing plate may again be used in a balancing plate product line.

Figure 60:
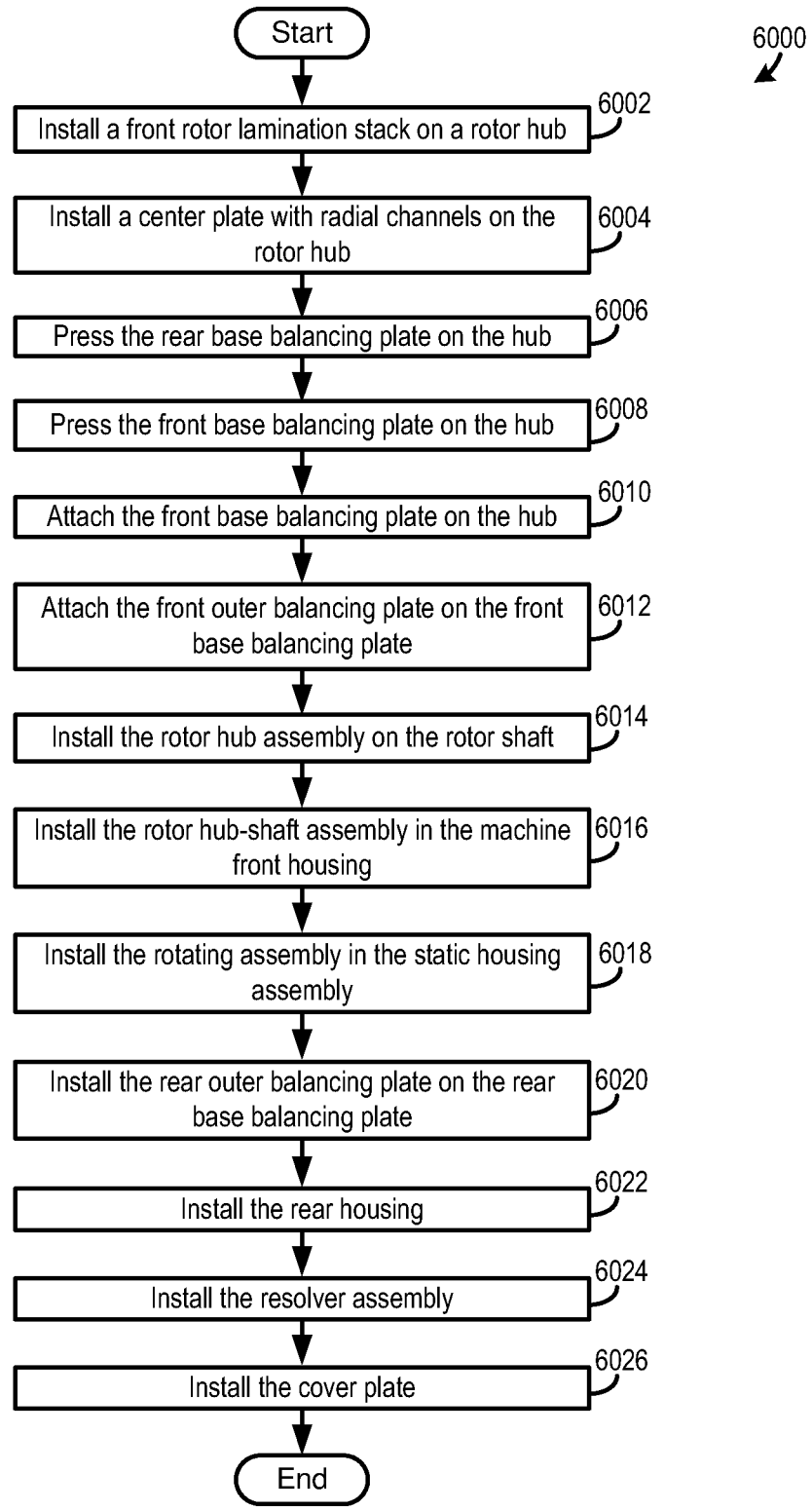
FIG. 60 shows a method for manufacturing an electric machine in an electromagnetic propulsion unit.

FIG. 60 shows a method 6000 for manufacturing an electric machine in an electromagnetic propulsion unit for a wheeled or tracked vehicle. The method may be used to constructed any of the electric machines, and specifically the balancing plate assemblies described herein, or other suitable electric machines with balancing plate assemblies. The method may be carried out via automated tooling machinery (e.g., tooling machinery with a controller that includes instructions stored in memory that is executable by a processor) and/or manufacturing factory personnel.

At 6002, the method includes installing a front rotor lamination stack on a rotor hub. For instance, the rotor stack may be mated with (e.g., press-fit) the rotor hub.

Next at 6004, the method includes installing a center plate with radial channels on the rotor hub. At 6006, the method includes pressing the rear base balancing plate on the hub.

At 6008, the method includes pressing the front base balancing plate on the hub. At 6010, the method includes attaching the front base balancing plate on the hub, and at 6012, the method includes attaching the front outer balancing plate on the front base balancing plate.

Next at 6014, the method includes installing the rotor hub assembly on the rotor shaft, and at 6016, the method includes installing the rotor hub-shaft assembly in the machine front housing. At 6018, the method includes installing the rotating assembly in the static housing assembly. The static housing assembly may include the machine housing, the stator assembly, and spray rings.

At 6020, the method includes installing the rear outer balancing plate on the rear base balancing plate. Next at 6022, the method includes installing the rear housing and at 6024, the method includes installing the resolver assembly. At 6026, the method includes installing the cover plate. Method 6000 allows the balancing plate assembly to be efficiently formed and incorporated with the rotor stack. As a result, manufacturing duration and cost of the electric machine is reduced.

FIG. 61 shows an example electric machine 6100 for an electromagnetic propulsion unit in a land-based wheeled or tracked vehicle. The manufacturing method 6000, shown in FIG. 60, may be used to assemble the electric machine 6100. However, as indicated above, the manufacturing method 6000 may be used construct other electric machines with balancing plate assemblies. The electric machine 6100 may include a housing assembly 6102 with housing portions 6104 (e.g., front and rear covers) and/or end plates 6105. A resolver assembly 6106 may also be included in the electric machine 6100 which may be arranged in a cavity 6108 of one of the housing portions 6104. A stator assembly 6110 may further be included in the electric machine along with a seal 6112. A rotor hub-shaft assembly 6114 including the previously described components (e.g., the rotor shaft, the balancing plate assemblies, the rotor stack, etc.) is further included in the electric machine. Additionally, a spray ring 6116 may be included in the electric machine. The electric machine 6100 may be efficiently installed using the previously described manufacturing method 6000.

The technical effect of the method for manufacturing the electric machine described herein is to increase manufacturing efficiency and decrease manufacturing cost by providing a modular balancing plate assembly with features that can be quickly combined to construct the balancing plate assembly.

FIGS. 1-59 and 61 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

As used herein, the terms "approximately" and "substantially" is construed to mean plus or minus five percent of the range unless otherwise specified.

The invention will be further described in the following paragraphs. In one aspect, an electromagnetic propulsion unit for a land-based wheeled or tracked vehicle is provided that comprises: a balancing plate assembly comprising: a base plate fixating the rotor stack to the rotor shaft; and an outer plate designed to couple to a rotor assembly; wherein the outer plate includes a lip that is designed to, during rotor assembly rotation, pump one or more fluids from an air gap formed between the rotor assembly and a stator; and wherein the outer plate is constructed out of a non-electrically conductive material.

In another aspect, an electromagnetic propulsion unit for a land-based wheeled or tracked vehicle is provided that comprises: a stator; a rotor at least partially circumferentially surrounded by the stator and including a rotor shaft and a rotor stack; an air gap positioned between the rotor and the stator; and a balancing plate assembly comprising: a base plate fixating the rotor stack to the rotor shaft; and a non-electrically conductive outer plate coupled to the base plate; wherein the non-electrically conductive outer plate includes a lip that is profiled to pump a mixture of air and oil from the air gap.

In yet another aspect, a method for constructing an electric machine in an electromagnetic propulsion unit for a land-based wheeled or tracked vehicle is provided that comprises: attaching a non-electrically conductive outer plate to a non-magnetic base plate to form a balancing plate assembly; and attaching the balancing plate assembly to a rotor assembly; wherein the non-electrically conductive outer plate includes a lip that is designed to, during rotor assembly rotation, pump one or more fluids from an air gap formed between the rotor assembly and a stator. In one example, attaching the non-electrically conductive outer plate to the non-magnetic base plate may include inserting a plurality of attachment devices through a plurality of openings in the non-electrically conductive outer plate and threading the plurality of attachment devices into a plurality of threaded bores in the non-magnetic base plate.

In another aspect, an electromagnetic propulsion unit for a land-based wheeled or tracked vehicle is provided that comprises: a rotor stack; a rotor shaft; and a balancing plate assembly comprising: a base plate fixating the rotor stack to the rotor shaft; wherein the base plate includes an air channel that axially extends through the base plate; and a planar channel formed between the rotor stack and the base plate and in fluidic communication with the air channel.

In yet another aspect, an electromagnetic propulsion unit for a land-based wheeled or tracked vehicle is provided that comprises: a stator; a rotor including a rotor shaft and a rotor stack and at least partially circumferentially surrounded by the stator; an air gap positioned between the rotor and the stator; and a balancing plate assembly comprising: a base plate fixating the rotor stack to the rotor shaft; wherein the base plate includes an air channel that axially extends through the base plate; and wherein the air channel includes an oil separator that is designed remove oil from the flow of the one or more fluids from the air flowing through the air channel and into an air passage arrangement.

In still another aspect, an electric machine product line, for an electromagnetic propulsion unit is a land-based wheeled or tracked vehicle, is provided that comprises: a first base balancing plate including a first set of air channels that axially extend therethrough; and a second base balancing plate including a second set of air channels that axially extend therethrough at different locations than the first set of air channels; wherein the first and second base balancing plates have a similar inner diameter, outer diameter, and a plurality of attachment interfaces.

In any of the aspects or combinations of the aspects, the one or more fluids may include air and oil.

In any of the aspects or combinations of the aspects, the lip may include a planar surface that is adjacent to an axial end of the air gap.

In any of the aspects or combinations of the aspects, the planar surface may radially extend beyond an outer diameter of the air gap and create a centrifugal force on the one or more fluids adjacent to the planar surface.

In any of the aspects or combinations of the aspects, the lip may include a curved surface that is adjacent to an axial end of the air gap.

In any of the aspects or combinations of the aspects, the lip may include an inner surface, and a planar channel may be formed between a rotor stack and the inner surface.

In any of the aspects or combinations of the aspects, the planar channel may be profiled to receive airflow from an air channel in a base plate.

In any of the aspects or combinations of the aspects, during rotation of the rotor assembly, the air gap may include an inlet that receives air flow from an air passage, and the air passage may extend through a rotor stack and is positioned radially inward from the air gap.

In any of the aspects or combinations of the aspects, the air passage may be designed to receive air from a machine end-space.

In any of the aspects or combinations of the aspects, the outer plate may include a plurality of axially extending ridges.

In any of the aspects or combinations of the aspects, during rotation of the rotor assembly, the air gap may include an inlet profiled to receive air flow from an air passage that extends through a rotor stack and is positioned radially inward from the air gap.

In any of the aspects or combinations of the aspects, the lip may include a straight inner surface that extends across an axial end of the air gap.

In any of the aspects or combinations of the aspects, the non-electrically conductive outer plate may include a plurality of ridges that axially extend from the lip toward the air gap.

In any of the aspects or combinations of the aspects, the lip may include a first curved surface that is adjacent to an axial end of the air gap.

In any of the aspects or combinations of the aspects, the lip may include a second curved surface positioned axially outward from the first curved surface.

In any of the aspects or combinations of the aspects, the second curved surface may be positioned on an axial side of the non-electrically conductive outer plate opposite of the first curved surface.

In any of the aspects or combinations of the aspects, the non-electrically conductive outer plate may include an outer diameter that is greater than an inner diameter of a lamination stack in the stator.

In any of the aspects or combinations of the aspects, the one or more fluids may include air and oil.

In any of the aspects or combinations of the aspects, the propulsion unit may further comprise an air passage arrangement that is in fluidic communication with the air channel, wherein the air passage arrangement comprises an air passage that extends through the rotor stack and includes an outlet that opens into the air gap.

In any of the aspects or combinations of the aspects, the air passage may include a first section that axially extends through the rotor stack and a second section that radially extends through the rotor stack.

In any of the aspects or combinations of the aspects, the second section may be formed by one or more cutouts in a plate that is positioned axially between two sections of the rotor stack.

In any of the aspects or combinations of the aspects, the air passage arrangement may include a planar channel formed between the rotor stack and the base plate.

In any of the aspects or combinations of the aspects, the electromagnetic propulsion unit may further comprise an outer plate coupled to the base plate and including a lip that is positioned radially outward from an outer diameter of the base plate.

In any of the aspects or combinations of the aspects, the air channel may include an oil separator that is designed remove oil from the flow of the one or more fluids through the air channel.

In any of the aspects or combinations of the aspects, the oil separator may be designed to expel the oil axially outward from the balancing plate assembly.

In any of the aspects or combinations of the aspects, the propulsion unit may further comprise an air passage arrangement designed to flow one or more fluids through the air gap and the air passage arrangement may include an air passage designed to receive air from a machine end-space.

In any of the aspects or combinations of the aspects, the air passage arrangement may be designed to flow one or more fluids through the air gap.

In any of the aspects or combinations of the aspects, the air passage may extend through a radial rotor section that is coupled to the rotor shaft.

In any of the aspects or combinations of the aspects, the radial rotor section may be positioned adjacent to an axial midline of the rotor assembly.

In any of the aspects or combinations of the aspects, the base plate may be constructed out of a non-magnetic material.

In any of the aspects or combinations of the aspects, the non-magnetic material may include aluminum.

In any of the aspects or combinations of the aspects, the air channel may be in fluidic communication with one or more of: an air passage that axially extends through the rotor stack; and a planar channel that is formed between the rotor stack and the base plate.

In any of the aspects or combinations of the aspects, an outer axial peripheral surface of the planar channel may form an angle with a radial axis.

In any of the aspects or combinations of the aspects, the base plate may include a plurality of threaded attachment interfaces that are profiled to receive a plurality of attachment devices that are configured to couple a non-electrically conductive outer plate to the base plate.

In any of the aspects or combinations of the aspects, the first and second base balancing plates may be constructed out of a similar metal.

In any of the aspects or combinations of the aspects, the non-magnetic plate may be constructed out of a polymer.

In any of the aspects or combinations of the aspects, the non-magnetic plate may be constructed out of a polymer.

In another representation, a rotor plate arrangement is provided that comprises an inner non-magnetic plate and an outer non-electrically conductive ring, wherein the inner non-magnetic plate and the outer non-electrically conductive ring are constructed out of different materials, wherein the outer non-electrically conductive ring includes a centrifugal pumping lip that, during rotation, applies centrifugal forces one or more fluids surrounding the lip to drive the flow of the one or more fluid axially outwards through an air gap outlet.

In yet another representation, an electromagnetic propulsion unit for a wheeled or tracked vehicle is provided that comprises a stator; a rotor including a rotor shaft and a rotor stack and at least partially circumferentially surrounded by the stator; wherein an air gap is positioned between the rotor and the stator; and a balancing plate assembly comprising: a base plate fixating the rotor stack to the rotor shaft; and an air passage arrangement designed to flow one or more fluids through the air gap; wherein the air passage arrangement includes an air passage designed to receive air from a machine end-space.

In any of the aspects, representations, or combinations of the aspects and/or representations, the air passage in the air passage arrangement may extend through a radial rotor section that is coupled to the rotor shaft.

In any of the aspects, representations, or combinations of the aspects and/or representations, the radial rotor section may be positioned adjacent to an axial midline of the rotor stack.

Note that the example manufacturing and control routines included herein can be used to manufacture various electromagnetic propulsion units with various electric machine, and/or drive system configurations. At least some of the manufacturing and/or control method steps disclosed herein may be stored as executable instructions in non-transitory memory and may be carried out by the machinery or system including the controller in combination with the various sensors, actuators, and/or other hardware in combination with the electronic controller. As such, the described actions, operations, and/or functions may graphically represent code to be programmed into non-transitory memory of the computer readable storage medium in a system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to vehicle systems that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electromagnetic propulsion unit for a land-based wheeled or tracked vehicle, comprising:
a balancing plate assembly coupled to a rotor assembly and comprising:
a base plate directly coupled to the rotor stack and a rotor hub; and
an outer plate directly coupled to the rotor stack;
wherein the outer plate is removably coupled to the base plate;
wherein the outer plate circumferentially surrounds the base plate;
wherein the outer plate is positioned circumferentially inward from stator end windings;
wherein the outer plate includes a lip that is designed to, during rotor assembly rotation, pump air and oil from an air gap formed between the rotor assembly and a stator; and
wherein the outer plate is constructed out of a non-electrically conductive material.

2. The electromagnetic propulsion unit of claim 1, wherein the one or more fluids include air and oil.

3. The electromagnetic propulsion unit of claim 1, wherein the lip includes a planar surface that is adjacent to an axial end of the air gap.

4. The electromagnetic propulsion unit of claim 3, wherein the planar surface radially extends beyond an outer diameter of the air gap and creates a centrifugal force on the air and oil adjacent to the planar surface.

5. The electromagnetic propulsion unit of claim 1, wherein the lip includes a curved surface that is adjacent to an axial end of the air gap and extends circumferentially around the outer plate.

6. The electromagnetic propulsion unit of claim 1, wherein:
the lip includes an inner surface; and
a planar channel is formed between a rotor stack and the inner surface.

7. The electromagnetic propulsion unit of claim 6, wherein the planar channel is profiled to receive airflow from an air channel in a base plate.

8. The electromagnetic propulsion unit of claim 1, wherein:
during rotation of the rotor assembly, the air gap includes an inlet that receives air flow from an air passage; and the air passage extends through a rotor stack and is positioned radially inward from the air gap.

9. The electromagnetic propulsion unit of claim 8, wherein the air passage is designed to receive air from a machine end-space.

10. The electromagnetic propulsion unit of claim 1, wherein the outer plate includes a plurality of axially extending ridges.

11. The electromagnetic propulsion unit of claim 1, wherein, during rotation of the rotor assembly, the air gap includes an inlet profiled to receive air flow from an air passage that extends through a rotor stack and is positioned radially inward from the air gap.

12. An electromagnetic propulsion unit for a land-based wheeled or tracked vehicle, comprising:
    a stator including end windings that extend axially outward from a stack of stator laminations;
    a rotor at least partially circumferentially surrounded by the stator and including a rotor shaft and a rotor stack;
    an air gap positioned between the rotor and the stator; and
    a balancing plate assembly comprising:
        a base plate directly coupled to the rotor stack and a rotor hub; and
        a non-electrically conductive outer plate removably coupled to the base plate;
    wherein the base plate is directly coupled to the rotor stack and a rotor hub;
    wherein the non-electrically conductive outer plate is directly coupled to the rotor stack;
    wherein the outer plate is removably coupled to the base plate;
    wherein the outer plate circumferentially surrounds the base plate;
    wherein the outer plate is positioned circumferentially inward from the end windings; and
    wherein the non-electrically conductive outer plate includes a lip that is profiled to pump a mixture of air and oil from the air gap.

13. The electromagnetic propulsion unit of claim 12, wherein the lip includes a straight inner surface that extends across an axial end of the air gap.

14. The electromagnetic propulsion unit of claim 12, wherein the non-electrically conductive outer plate includes a plurality of ridges that axially extend from the lip toward the air gap.

15. The electromagnetic propulsion unit of claim 12, wherein the lip includes a first curved surface that is adjacent to an axial end of the air gap.

16. The electromagnetic propulsion unit of claim 15, wherein the lip includes a second curved surface positioned axially outward from the first curved surface.

17. The electromagnetic propulsion unit of claim 16, wherein the second curved surface is positioned on an axial side of the non-electrically conductive outer plate opposite of the first curved surface.

18. The electromagnetic propulsion unit of claim 12, wherein the non-electrically conductive outer plate includes an outer diameter that is greater than an inner diameter of a lamination stack in the stator.

19. A method for constructing an electric machine in an electromagnetic propulsion unit for a land-based wheeled or tracked vehicle, the method comprising:
    attaching a non-electrically conductive outer plate to a non-magnetic base plate to form a balancing plate assembly; and
    attaching the balancing plate assembly to a rotor assembly;
    wherein the non-electrically conductive outer plate includes a lip that is designed to, during rotor assembly rotation, pump air and oil from an air gap formed between the rotor assembly and a stator;
    wherein the non-magnetic base plate is directly coupled to a rotor stack and a rotor hub;
    wherein the outer plate is removably coupled to the base plate and is directly coupled to the rotor stack;
    wherein the outer plate circumferentially surrounds the base plate; and
    wherein the outer plate is positioned circumferentially inward from the end windings.

20. The method of claim 19, wherein attaching the non-electrically conductive outer plate to the non-magnetic base plate includes inserting a plurality of attachment devices through a plurality of openings in the non-electrically conductive outer plate and threading the plurality of attachment devices into a plurality of threaded bores in the non-magnetic base plate.

* * * * *